US009716457B2

(12) United States Patent
Yoshiura et al.

(10) Patent No.: US 9,716,457 B2
(45) Date of Patent: Jul. 25, 2017

(54) MOTOR CONTROL APPARATUS

(71) Applicant: KABUSHIKI KAISHA YASKAWA DENKI, Kitakyushu-shi (JP)

(72) Inventors: Yasufumi Yoshiura, Kitakyushu (JP); Yasuhiko Kaku, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/134,814

(22) Filed: Apr. 21, 2016

(65) Prior Publication Data
US 2016/0233808 A1 Aug. 11, 2016

Related U.S. Application Data

(63) Continuation of application No. PCT/JP2013/079163, filed on Oct. 28, 2013.

(51) Int. Cl.
*G05B 19/408* (2006.01)
*H02P 23/04* (2006.01)
(Continued)

(52) U.S. Cl.
CPC ............... *H02P 23/04* (2013.01); *H02P 6/10* (2013.01); *H02P 6/18* (2013.01); *H02P 23/0077* (2013.01); *H02P 23/14* (2013.01)

(58) Field of Classification Search
USPC .... 318/632, 568.22, 568.23, 400.15, 400.07, 318/400.23, 807, 400.02
See application file for complete search history.

(56) References Cited

U.S. PATENT DOCUMENTS 5,990,645 A 11/1999 Nakamura et al.
6,470,225 B1 * 10/2002 Yutkowitz .............. G05B 11/28
700/188
(Continued)

FOREIGN PATENT DOCUMENTS

JP 7-337057 12/1995
JP 11-155295 6/1999
(Continued)

OTHER PUBLICATIONS

International Preliminary Report of Patentability and Written Opinion issued May 12, 2016 in PCT/JP2013/079163 (English translation only).

(Continued)

*Primary Examiner* — Jorge L Carrasquillo
(74) *Attorney, Agent, or Firm* — Oblon, McClelland, Maier & Neustadt, L.L.P.

(57) ABSTRACT

[Problem] To enhance a speed loop gain even in a three-inertia mechanical resonance system. [Solution] A motor control apparatus (100) for controlling a motor, includes: a speed estimator (6) configured to estimate and output an equivalent rigid body speed of the motor, based on a torque command that is input to a motor model (4); a first feedback gain ($K_{d1}$) configured to obtain a first differential speed between a motor speed and the equivalent rigid body speed; a torque command generation unit (2) configured to generate the torque command, based on a speed deviation between a speed command and a second differential speed between the motor speed and the output of the first feedback gain ($K_{d1}$); and a stabilizing compensator (9) configured to obtain the first differential speed in parallel with the first feedback gain ($K_{d1}$), to change frequency characteristics of the first differential speed and to add the frequency characteristics to an output of the first feedback gain ($K_{d1}$).

11 Claims, 39 Drawing Sheets

(51) Int. Cl.
*H02P 6/10* (2006.01)
*H02P 6/18* (2016.01)
*H02P 23/14* (2006.01)
*H02P 23/00* (2016.01)

(56) References Cited

U.S. PATENT DOCUMENTS

| | | | | |
|---|---|---|---|---|
| 2002/0156541 | A1* | 10/2002 | Yutkowitz | G05B 11/28 700/28 |
| 2004/0113579 | A1* | 6/2004 | Zhang | G05B 13/021 318/611 |
| 2010/0079100 | A1* | 4/2010 | Kumagai | G05B 13/041 318/611 |
| 2013/0057191 | A1* | 3/2013 | Yoshiura | G05B 19/19 318/600 |

FOREIGN PATENT DOCUMENTS

| | | |
|---|---|---|
| JP | 3189865 | 7/2001 |
| JP | 2004-80973 | 3/2004 |
| JP | 2004-199495 | 7/2004 |

OTHER PUBLICATIONS

International Search Report issued Jan. 21, 2014 in PCT/JP2013/079163 filed Oct. 28, 2013 ( with English Translation).
Written Opinion issued Jan. 21, 2014 in PCT/JP2013/079163 filed Oct. 28, 2013.

* cited by examiner

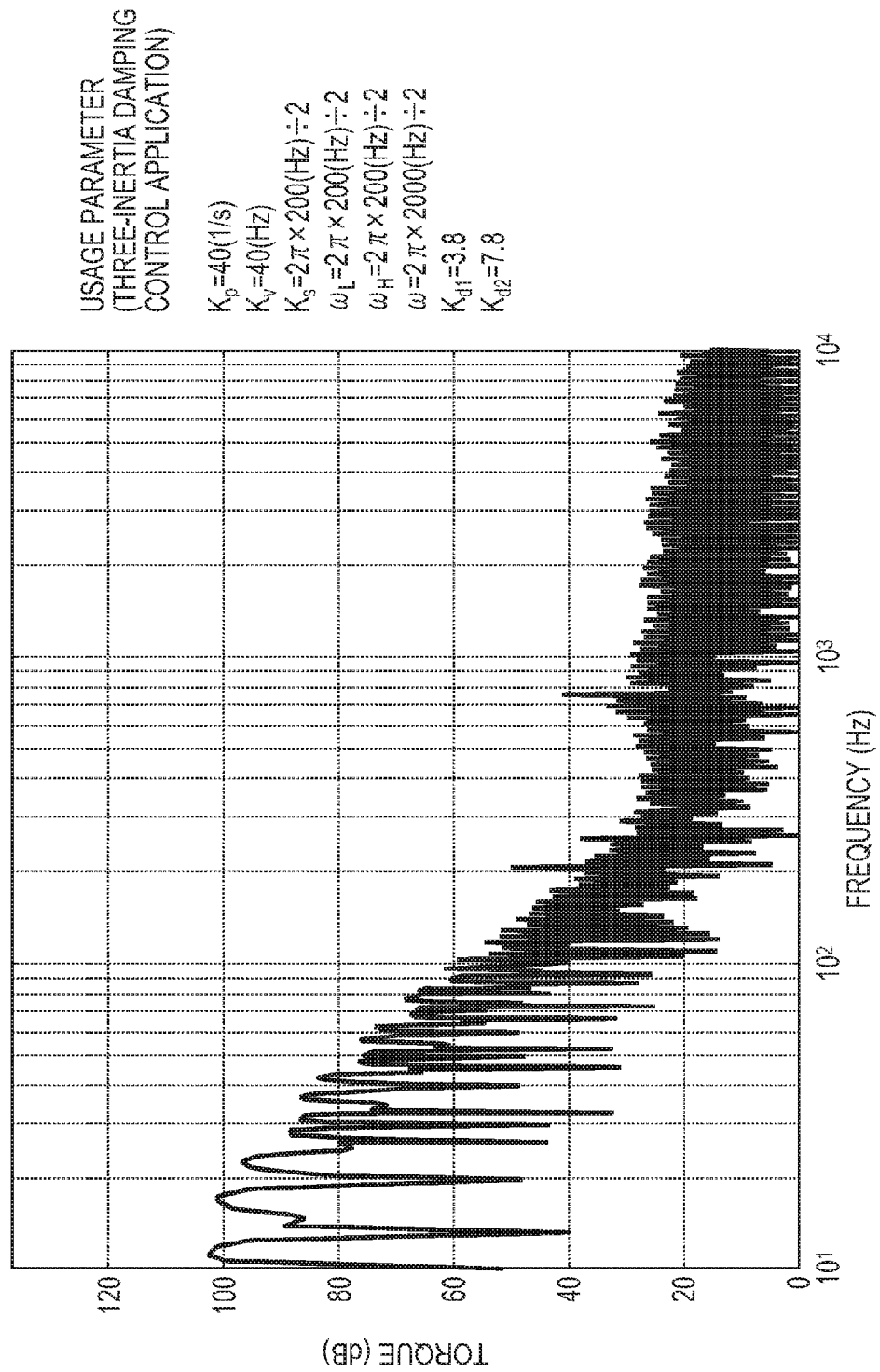

MOTOR CONTROL APPARATUS

CROSS-REFERENCE TO RELATED APPLICATIONS

The present application is based upon and claims the benefit of priority to International Patent Application No. PCT/JP2013/079163, filed Oct. 28, 2013, the entire contents of which are incorporated herein by reference.

TECHNICAL FIELD

The embodiments disclosed herein relate to a motor control apparatus.

BACKGROUND ART

Patent Literature 1 discloses a speed feedback loop that estimates an equivalent rigid body speed that is an output speed of a motor in the case of driving only an equivalent rigid body system, except a mechanical resonance system, of a load machine, based on a torque command, obtains a differential speed between the equivalent rigid body speed and the motor speed, and returns a differential speed between the differential speed and the motor speed in order to suppress an influence of the mechanical resonance system.

CITATION LIST

Patent Literature

Patent Literature 1: JP 3189865 B2

SUMMARY OF INVENTION

Technical Problem

However, in the above-described related art, it is possible to cope with only a case where the load machine is a two-inertia resonance system, and a speed loop gain of a three-inertia resonance system is limited. The reason is that the aforementioned damping control can suppress only the vibration components of a narrow band corresponding to a single resonance system, and in the three-inertia system with two resonance systems (two resonance bands), although the vibration components of lower resonance system can be suppressed, the damping control is limited in the resonance system in which a setting range of the speed loop gain is high.

The present invention has been made in view of such problems, and an object of the present invention is to provide a motor control apparatus capable of enhancing a speed loop gain even in a three-inertia mechanical resonance system.

Solution to Problem

In order to solve the above problem, according to one view of the present invention, it is provided that a motor control apparatus for controlling a motor, including: a speed estimator configured to estimate and output an equivalent rigid body speed of the motor, based on a torque command that is input to the motor; a first feedback gain configured to obtain a first differential speed between a motor speed and the equivalent rigid body speed; a torque command generation unit configured to generate the torque command, based on a speed deviation between a speed command and a second differential speed between the motor speed and the output of the first feedback gain; and a stabilizing compensator configured to obtain the first differential speed in parallel with the first feedback gain, to change frequency characteristics of the first differential speed and to add the frequency characteristics to an output of the first feedback gain.

Advantageous Effects of Invention

According to the present invention, it is possible to enhance a speed loop gain even in a three-inertia mechanical resonance system.

BRIEF DESCRIPTION OF DRAWINGS

FIG. 39 is a diagram illustrating a simulation result of the frequency characteristics of the output torque in the case of performing the three-inertia damping control on the control target 5.

DESCRIPTION OF EMBODIMENTS

Hereinafter, embodiments will be described with reference to the accompanying drawings.

<Control System Model of Present Embodiment>

Figure 1:
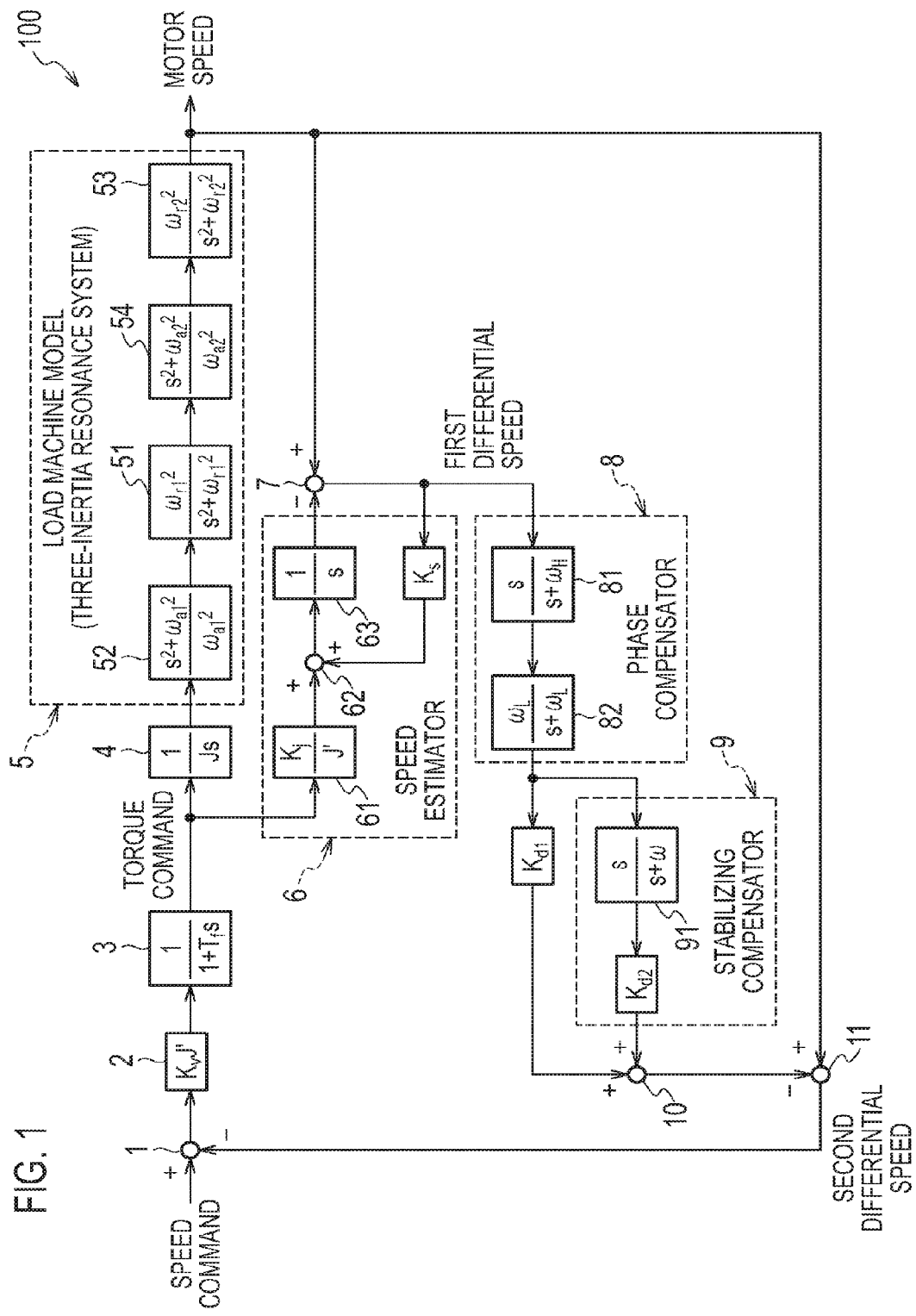
FIG. 1 is a control block diagram illustrating a control system model of an overall motor control apparatus of an embodiment.

First, a schematic configuration of a control system model of a motor control apparatus according to an embodiment will be described with reference to FIG. 1. Further, the control block diagram of FIG. 1 is expressed in the form of a transfer function also including a control target model (a load machine model) of a three-inertia resonance system to be described later, and a CPU (a calculation device; not illustrated separately) included in the motor control apparatus is illustrated as a set of functional blocks achieved by the execution of the software process. Also, in FIG. 1, in order to avoid complexity of illustration, a host control apparatus, a position control feedback loop and a current control feedback loop are omitted as much as possible and are represented by the simplified model.

In FIG. 1, a motor control apparatus 100 of this embodiment has a first subtracter 1, a torque command generation unit 2, a torque command filter 3, a motor model 4, a load machine model 5, a speed estimator 6, a second subtracter 7, a phase compensator 8, a first feedback gain $K_{d1}$, a stabilizing compensator 9, a first adder 10, and a third subtracter 11. The "gain" in the first feedback gain $K_{d1}$ means a function as an amplifier that simply amplifies an input signal at a constant amplification factor and outputs the signal, and is treated as a coefficient (multiplication coefficient) corresponding to the amplification factor in a mathematical meaning as a transfer function (the same also applies to "gain" such as other feedback gain, the loop gain and the adjustment gain).

The first subtracter 1 obtains the deviation by subtracting a second differential speed to be described later from the speed command that is input from a position control loop or a commander (not illustrated specifically). The deviation is multiplied by the torque command generation unit 2 including a speed loop gain Kv, and further outputs a value passed to the torque command filter 3 for removing the high-frequency noise components caused by sampling or the like, as the torque command.

The torque command is input to the motor model 4, and its output is input to the load machine model 5 to output the motor speed. The load machine model 5 is a mathematical model of the load machine of the three-inertia resonance system connected to the motor. Specifically, the load machine model 5 is a model obtained by multiplying a first resonance point model 51, a first anti-resonance point model 52, a second resonance point model 53 and a second anti-resonance point model 54 in series. The motor speed is output while having the resonance characteristics influenced by the load machine model 5.

Meanwhile, the torque command is also input to the speed estimator 6. The speed estimator 6 has an equivalent rigid body characteristic unit 61 including an inverse of an inertia moment J' of a motor rotor serving as an equivalent rigid body system, a speed adder 62, an integrator 63, and an adjustment gain Ks. The torque command input to the speed estimator 6 is input to the equivalent rigid body characteristic unit 61, and a first differential speed to be described later is input to adjustment gain Ks. The speed adder 62 adds the outputs of the equivalent rigid body characteristic unit 61 and the adjustment gain Ks, and the integrator 63 integrates the added output and outputs an equivalent rigid body speed. The equivalent rigid body speed thus output corresponds to a virtual motor speed assumed to be output when driving only a motor to which the torque command is input (when not connecting the load machine model 5).

The second subtracter 7 subtracts the equivalent rigid body speed from the motor speed to calculate a first differential speed therebetween. The first differential speed is input to the adjustment gain Ks of the speed estimator 6, and is also input to the phase compensator 8. The phase compensator 8 has a series combination of a set of a high-pass filter 81 and a low-pass filter 82, and the phase of the first differential speed is adjusted by the phase compensator 8.

The first differential speed output from the phase compensator 8 is input (acquired) to each of a first feedback gain $K_{d1}$ and the stabilizing compensator 9. The stabilizing compensator 9 has a series combination of an approximate differentiator 91 and a second feedback gain $K_{d2}$. The function of the stabilizing compensator 9 will be described in detail later.

The first adder 10 adds the output of the first feedback gain $K_{d1}$ and the output of the stabilizing compensator 9. The third subtracter 11 subtracts the output of the first adder 10 from the motor speed to calculate a second differential speed therebetween. Further, the first subtracter 1 subtracts the second differential speed from the speed command to calculate a deviation.

<Conventional Control System Model and Operation Thereof>

Figure 2:
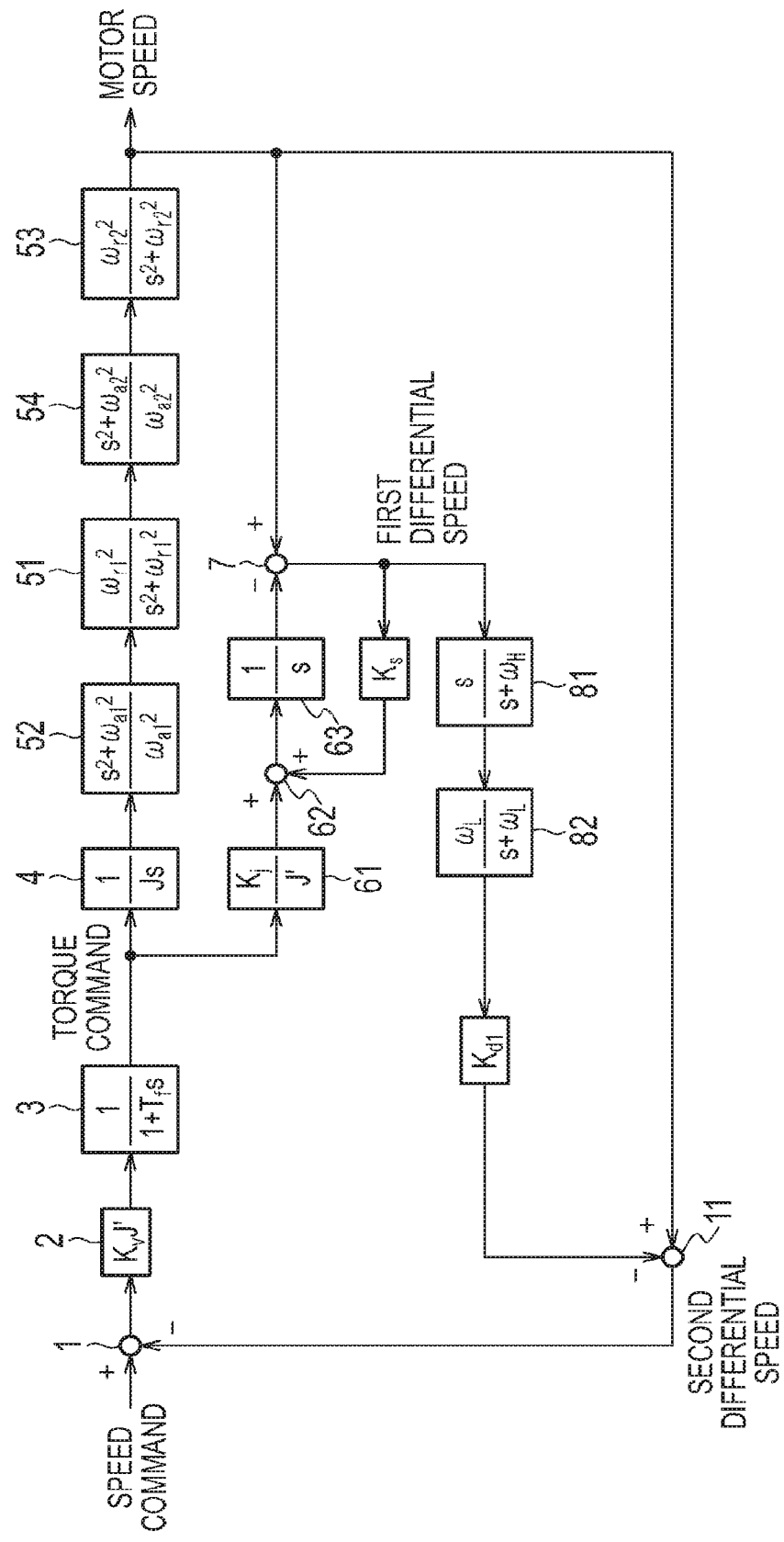
FIG. 2 is a control block diagram illustrating a control system model of an overall conventional motor controller.

Next, a control block diagram of a control system model that performs the conventional damping control is illustrated in FIG. 2. The conventional control model is obtained by excluding the stabilizing compensator 9 and the first adder 10 from the control model of the present embodiment. That is, the first differential speed output from the phase compensator 8 is input only to the first feedback gain $K_{d1}$, and the third subtracter 11 calculates a second differential speed between the motor speed and the output of the first feedback gain $K_{d1}$.

The conventional control system model is provided with a speed control feedback loop that generates a torque command by the torque command generation unit 2 based on the speed deviation between the speed command and the motor speed to input the torque command to the motor model 4. When an elastic element (the three-inertia resonance system in this example) is present in a transmission path of driving force in the load machine driven by the motor, the vibration components caused by the mechanical resonance of the load machine is superimposed on the motor speed. Although it is required to raise the speed loop gain Kv in the torque command generation unit 2 to improve the response speed of the overall control system, when the speed loop gain Kv is raised to a frequency of the mechanical resonance (an anti-resonance point and a resonance point) or higher, the vibration components of the mechanical resonance significantly appear in the motor speed. The vibration components are obtained by especially amplifying only the frequency components of the mechanical resonance (that is, components obtained by enhancing the gain), and since the phase of the mechanical resonance part greatly changes, when it is returned to the speed feedback loop, the operation of the overall control system becomes unstable (an oscillation or the like occurs). To avoid this problem, the setting range of the speed loop gain Kv is limited due to the frequency of the mechanical resonance.

Therefore, in the conventional control system model illustrated here, a damping control for suppressing the mechanical resonance of the load machine was performed on the speed feedback loop to improve the setting range of the speed loop gain Kv. In the damping control, first, the speed estimator 6 estimates and outputs the equivalent rigid body speed of the motor, based on the torque command. The equivalent rigid body speed corresponds to the output speed of the motor in the case of driving only the equivalent rigid body system of the motor model 4, except the mechanical resonance system of the load machine with respect to the same torque command. The first differential speed between the equivalent rigid body speed and the actually detected motor speed corresponds to the vibration component itself caused by the mechanical resonance of the load machine. The second differential speed obtained by multiplying the first differential speed by the first feedback gain $K_{d1}$ and by subtracting it from the motor speed becomes a feedback signal that increases the attenuation of the vibration characteristics of the mechanical resonance, and it is possible to stabilize the speed feedback loop by generating a torque command through the torque command generation unit 2 based on the speed deviation between the feedback signal and the speed command. That is, since it is possible suppress the influence of the mechanical resonance of the load machine in the control system, the speed loop gain Kv can be set to a high level, thereby improving the response speed.

However, in the conventional damping control, it is possible to cope with only a two-inertia resonance system including the elastic element at only one position in the load machine, and the speed loop gain Kv is limited in a three-inertia resonance system including the elastic elements at two positions, that is, a resonance system having two sets of the anti-resonance point and the resonance point. The reason is that the aforementioned damping control can suppress only the vibration components of a band corresponding to a single resonance system, and in a three-inertia resonance system having the two resonance systems (two resonance bands), although the vibration components of one resonance system can be suppressed, the control is limited in one resonance system in which the setting range of the speed loop gain Kv is different.

Figure 3:
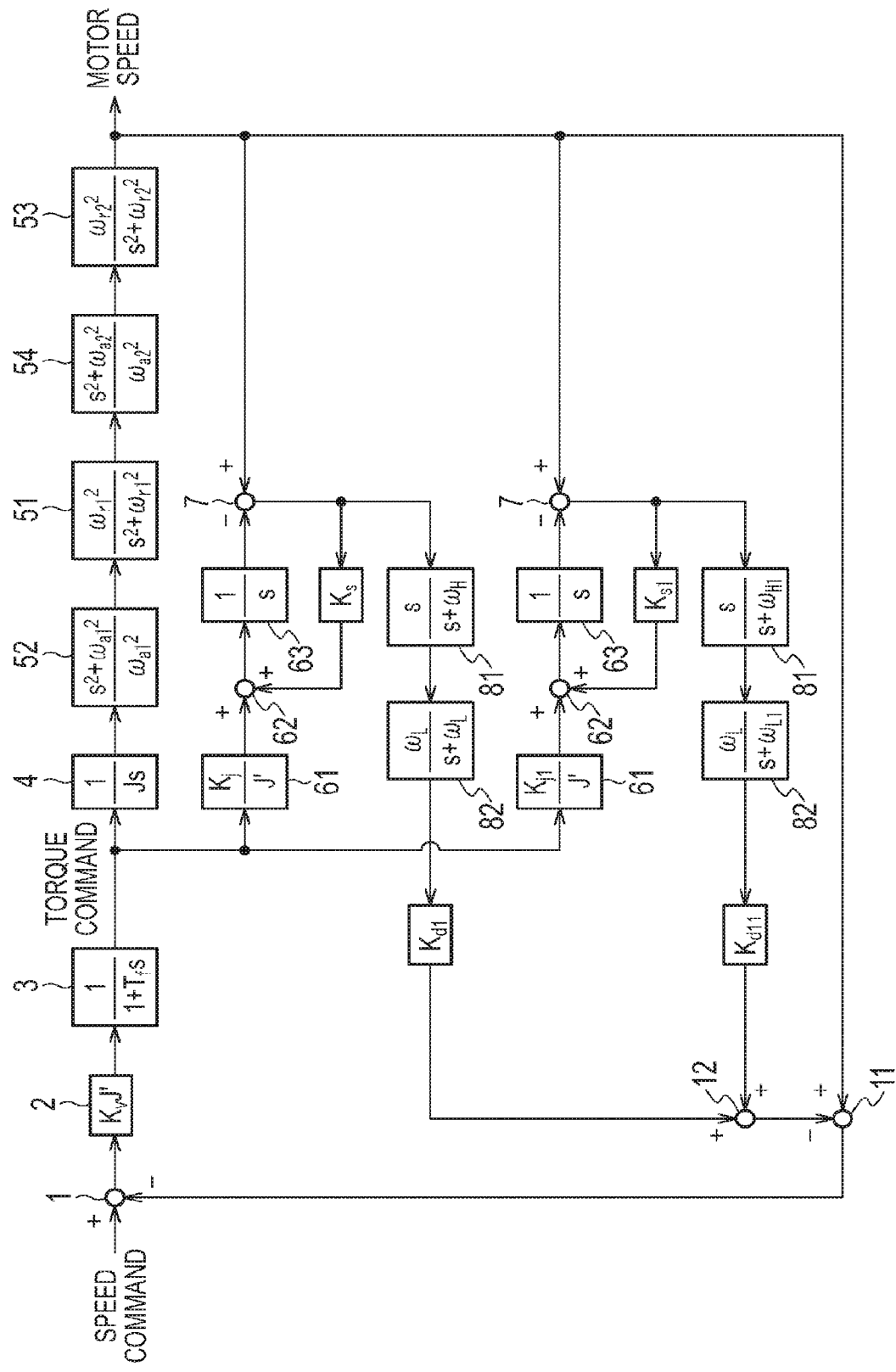
FIG. 3 is a control block diagram illustrating a control system model of the overall motor control apparatus equipped with dual conventional damping controls.

As a countermeasure therefor, a configuration is considered in which a path portion that outputs a second differential speed as illustrated in FIG. 3, that is, a path portion including the speed estimator 6, the second subtracter 7, the phase compensator 8, and the first feedback gain $K_{d1}$ is doubly provided in parallel to individually suppress the vibration components of the resonance system in each path portion. However, it is not possible to sufficiently obtain the effect of suppressing the vibration components even by this configuration.

<Control Principle of Present Embodiment>

The principle of the damping control (see FIG. 1) of the present embodiment on the three-inertia resonance system will be described below. When the conventional damping control (see FIG. 2) is applied to the two-inertia system, a closed loop formed by the conventional damping control behaves to increase the attenuation coefficient of the resonance section. First, when the conventional damping control is applied to the three-inertia system, the changes in behavior are illustrated.

Figure 4:
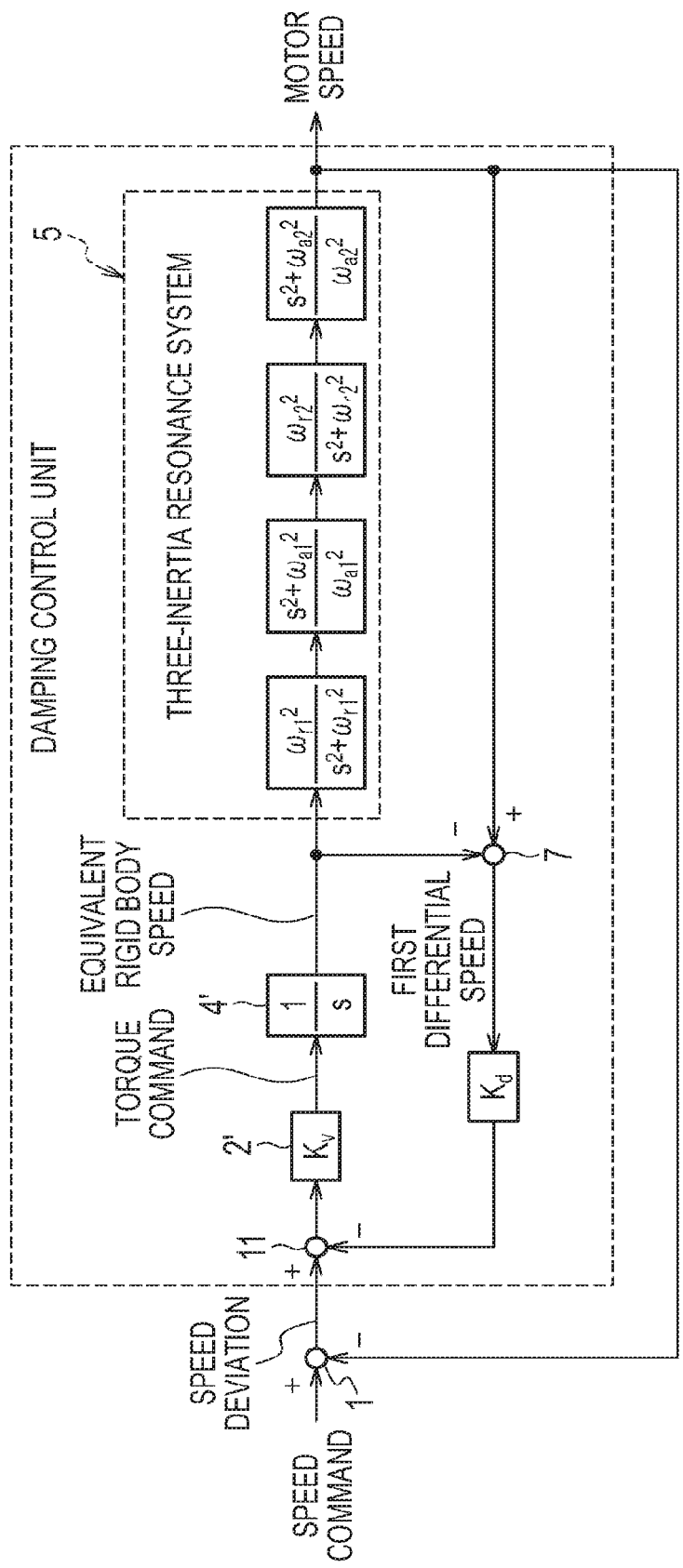
FIG. 4 is a control block diagram of a case where a total inertia moment is set to 1 to describe a principle of a damping control of the present embodiment.

To briefly describe the principles, the equivalent rigid body speed as a virtual signal is assumed to be detectable. To perform the examination, a speed P control (speed proportional control) including the three-inertia system as in FIG. 4 is considered. In FIG. 4, a total inertia moment (J) of a motor model 4' is defined as "1" for convenience. Further, in the FIG. 4, the same parts as those illustrated in FIG. 1 are denoted by the same reference numerals. The transfer function of the open loop from the speed deviation to the output (output obtained by multiplying the first differential speed by the feedback gain $K_{(d)}$) of the damping control unit is expressed by the following formula.

$$G_{open} = \frac{K_d K_v}{s}\left(\frac{s^2+\omega_{r1}^2}{s^2+\omega_{r1}^2}\cdot\frac{\omega_{r1}^2}{\omega_{a1}^2}\times\frac{s^2+\omega_{r2}^2}{s^2+\omega_{r2}^2}\cdot\frac{\omega_{r2}^2}{\omega_{a2}^2}-1\right) \quad (1)$$

$$= \frac{K_d K_v}{s}\frac{s^2\left[\left(\frac{\omega_{r1}^2\omega_{r2}^2}{\omega_{a1}^2\omega_{a2}^2}-1\right)s^2+\left\{(\omega_{a1}^2+\omega_{a2}^2)\frac{\omega_{r1}^2\omega_{r2}^2}{\omega_{a1}^2\omega_{a2}^2}-(\omega_{r1}^2+\omega_{r2}^2)\right\}\right]}{(s^2+\omega_{r1}^2)(s^2+\omega_{r2}^2)}$$

Accordingly, the transfer function of the closed loop from the speed deviation to the motor speed is expressed by the following formula.

$$G_{close} = \frac{1}{1+G_{open}}\cdot\frac{K_v}{s}\frac{\omega_{r1}^2}{s^2+\omega_{r1}^2}\frac{s^2+\omega_{a1}^2}{\omega_{a1}^2}\frac{\omega_{r2}^2}{s^2+\omega_{r2}^2}\frac{s^2+\omega_{a2}^2}{\omega_{a2}^2} \quad (2)$$

$$= \frac{K_v}{s}\cdot\frac{s^2+\omega_{a1}^2}{\omega_{a1}^2}\cdot\frac{s^2+\omega_{a2}^2}{\omega_{a2}^2}\cdot\frac{\omega_{r1}^2\omega_{r2}^2}{s^4+a_3 s^3+a_2 s^2+a_1 s+a_0}$$

Here, $$a_3 = K_d K_v\left(\frac{\omega_{r1}^2\omega_{r2}^2}{\omega_{a1}^2\omega_{a2}^2}-1\right) \quad (3)$$

$$a_2 = \omega_{r1}^2+\omega_{r2}^2 \quad (4)$$

$$a_1 = K_d K_v\left\{(\omega_{a1}^2+\omega_{a2}^2)\frac{\omega_{r1}^2\omega_{r2}^2}{\omega_{a1}^2\omega_{a2}^2}-(\omega_{r1}^2+\omega_{r2}^2)\right\} \quad (5)$$

$$a_0 = \omega_{r1}^2\omega_{r2}^2 \quad (6)$$

As it is clear from Formula (4), a second-order term in the characteristic polynomial of a right side fourth term of Formula (2) does not change by the conventional damping control. Therefore, in the conventional damping control, it is not possible to impart the full attenuation to the three-inertia resonance system (there is a mechanical system incapable of being stabilized.)

From the above results, when the damping gain $K_d$ enters all the first-order to third-order terms in the characteristic polynomial of the right side fourth term of Formula (2), it is possible to impart a full attenuation to the three-inertia resonance system. The simplest way to be considered is to input the signal obtained by differentiating or integrating the output of the conventional damping control in parallel to the output of the conventional damping control. The differentiated signal affects the second-order and fourth-order coefficients for the characteristic polynomial of the right side fourth term of Formula (2), and the integrated signal affects the zero-order (constant term) and second-order coefficients for the characteristic polynomial of the right side fourth term of Formula (2). Although the second-order coefficients are influenced in either case, since it is desirable that an influence on the constant term is avoided, the differential signal is adopted in the present embodiment. That is, a differential path is added as illustrated in FIGS. 4 and 5.

Figure 5:
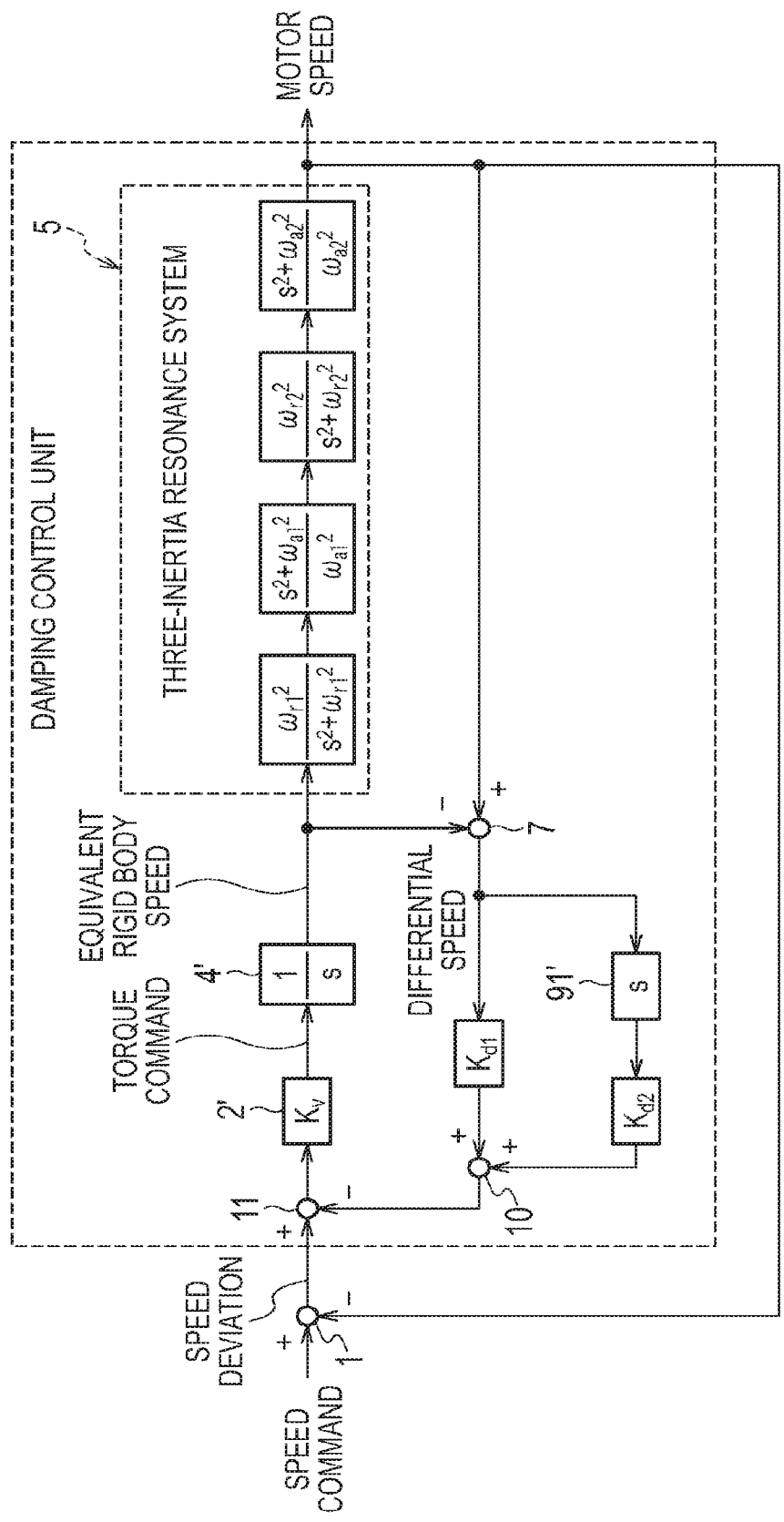
FIG. 5 is a control block diagram in the case of providing a differential path in the control block diagram of FIG. 4.

In FIG. 5, the transfer function of the open loop from the speed deviation to the output (sum of each of the outputs obtained by multiplying the first differential speed by the first feedback gain $K_{d1}$ and the second feedback gain $K_{d2}$) of the damping control unit is as following formula.

$$G_{open} = \frac{(K_{d1}+K_{d2}s)K_v}{s}\left(\frac{s^2+\omega_{r1}^2}{s^2+\omega_{r1}^2}\cdot\frac{\omega_{r1}^2}{\omega_{a1}^2}\times\frac{s^2+\omega_{r2}^2}{s^2+\omega_{r2}^2}\cdot\frac{\omega_{r2}^2}{\omega_{a2}^2}-1\right) \quad (7)$$

$$= \frac{(K_{d1}+K_{d2}s)K_v}{s}\frac{s^2\left[\left(\frac{\omega_{r1}^2\omega_{r2}^2}{\omega_{a1}^2\omega_{a2}^2}-1\right)s^2+\left\{(\omega_{a1}^2+\omega_{a2}^2)\frac{\omega_{r1}^2\omega_{r2}^2}{\omega_{a1}^2\omega_{a2}^2}-(\omega_{r1}^2+\omega_{r2}^2)\right\}\right]}{(s^2+\omega_{r1}^2)(s^2+\omega_{r2}^2)}$$

Accordingly, the transfer function of the closed loop from the speed deviation to the motor speed is as follows.

$$G_{close} = \frac{1}{1+G_{open}}\cdot\frac{K_v}{s}\frac{\omega_{r1}^2}{s^2+\omega_{r1}^2}\frac{s^2+\omega_{a1}^2}{\omega_{a1}^2}\frac{\omega_{r2}^2}{s^2+\omega_{r2}^2}\frac{s^2+\omega_{a2}^2}{\omega_{a2}^2} \quad (8)$$

$$= \frac{K_v}{s}\cdot\frac{s^2+\omega_{a1}^2}{\omega_{a1}^2}\cdot\frac{s^2+\omega_{a2}^2}{\omega_{a2}^2}\cdot\frac{\omega_{r1}^2\omega_{r2}^2}{a_4' s^4+a_3 s^3+a_2' s^2+a_1 s+a_0}$$

$$= \frac{K_v}{s}\cdot\frac{s^2+\omega_{a1}^2}{\omega_{a1}^2}\cdot\frac{s^2+\omega_{a2}^2}{\omega_{a2}^2}\cdot\frac{\frac{\omega_{r1}^2\omega_{r2}^2}{a_4'}}{s^4+\frac{a_3}{a_4'}s^3+\frac{a_2'}{a_4'}s^2+\frac{a_1}{a_4'}s+\frac{a_0}{a_4'}} \quad (8')$$

Here, $$a_4' = K_{d2}K_v\left(\frac{\omega_{r1}^2\omega_{r2}^2}{\omega_{a1}^2\omega_{a2}^2}-1\right)+1 \quad (9)$$

$$a_3 = K_{d1}K_v\left(\frac{\omega_{r1}^2\omega_{r2}^2}{\omega_{a1}^2\omega_{a2}^2}-1\right) \quad (10)$$

$$a_2' = K_{d2}K_v\left\{(\omega_{a1}^2+\omega_{a2}^2)\frac{\omega_{r1}^2\omega_{r2}^2}{\omega_{a1}^2\omega_{a2}^2}-(\omega_{r1}^2+\omega_{r2}^2)\right\}+(\omega_{r1}^2+\omega_{r2}^2) \quad (11)$$

$$a_1 = K_{d1}K_v\left\{(\omega_{a1}^2+\omega_{a2}^2)\frac{\omega_{r1}^2\omega_{r2}^2}{\omega_{a1}^2\omega_{a2}^2}-(\omega_{r1}^2+\omega_{r2}^2)\right\} \quad (12)$$

$$a_0 = \omega_{r1}^2\omega_{r2}^2 \quad (13)$$

From Formulas (10) to (12), it is clear that $K_{d1}$ or $K_{d2}$ is included in the first to third-order terms in the characteristic polynomial of the right side fourth term of Formula (8). Therefore, there is a possibility that the control block of FIG. 5 can impart the full attenuation to the three-inertia resonance system. However, as it is clear from Formula (9), in the control block of FIG. 5, the coefficient is also included in the fourth term (highest-order term) in the characteristic polynomial of the right side fourth term of Formula (8). To examine the influence, Formula (8) is modified as in Formula (8)'.

Attention is paid to the second-order term in the characteristic polynomial of the right side fourth term of Formula (8)'.

$$K_{d2}K_v\left(\frac{\omega_{r1}^2\omega_{r2}^2}{\omega_{a1}^2\omega_{a2}^2}-1\right)\gg 1$$

Thus, $a_2'/a_4'$ may be approximately modifying as in the following formula.

$$\frac{a_2'}{a_4'} = \frac{(\omega_{a1}^2+\omega_{a2}^2)\frac{\omega_{r1}^2\omega_{r2}^2}{\omega_{a1}^2\omega_{a2}^2} + \left(\frac{1}{K_{d2}K_v}-1\right)(\omega_{r1}^2+\omega_{r2}^2)}{\frac{\omega_{r1}^2\omega_{r2}^2}{\omega_{a1}^2\omega_{a2}^2}-1} \quad (14)$$

As it is clear from Formula (14), when $K_{d2}Kv$ is greater than 1, $(1/K_{d2}Kv)-1$ becomes negative, and thus, the term of the molecule of Formula (14) decreases. That is, the second-order term in the characteristic polynomial of the right side fourth term of Formula (8') decreases. Usually, since there is a relation of $Kv \gg 1$, the adjustment of $K_{d2}$ becomes very difficult in this state.

Therefore, a further modification is considered. Relation of Formula (14) is considered to occur since $Kv$ and $K_{d2}$ are included in $a_4'$ that is a highest-order term in view of expansion of Formula. By the above examination, it is considered that if the coefficient of the highest-order term in the characteristic polynomial of the right side fourth term of Formula (8) is "1", the above-mentioned disadvantage does not occur. As achieving means, it is considered to change the differentiator 91' to the first-order approximate differentiator 91. That is, FIG. 5 is changed as illustrated in FIG. 6.

Figure 6:
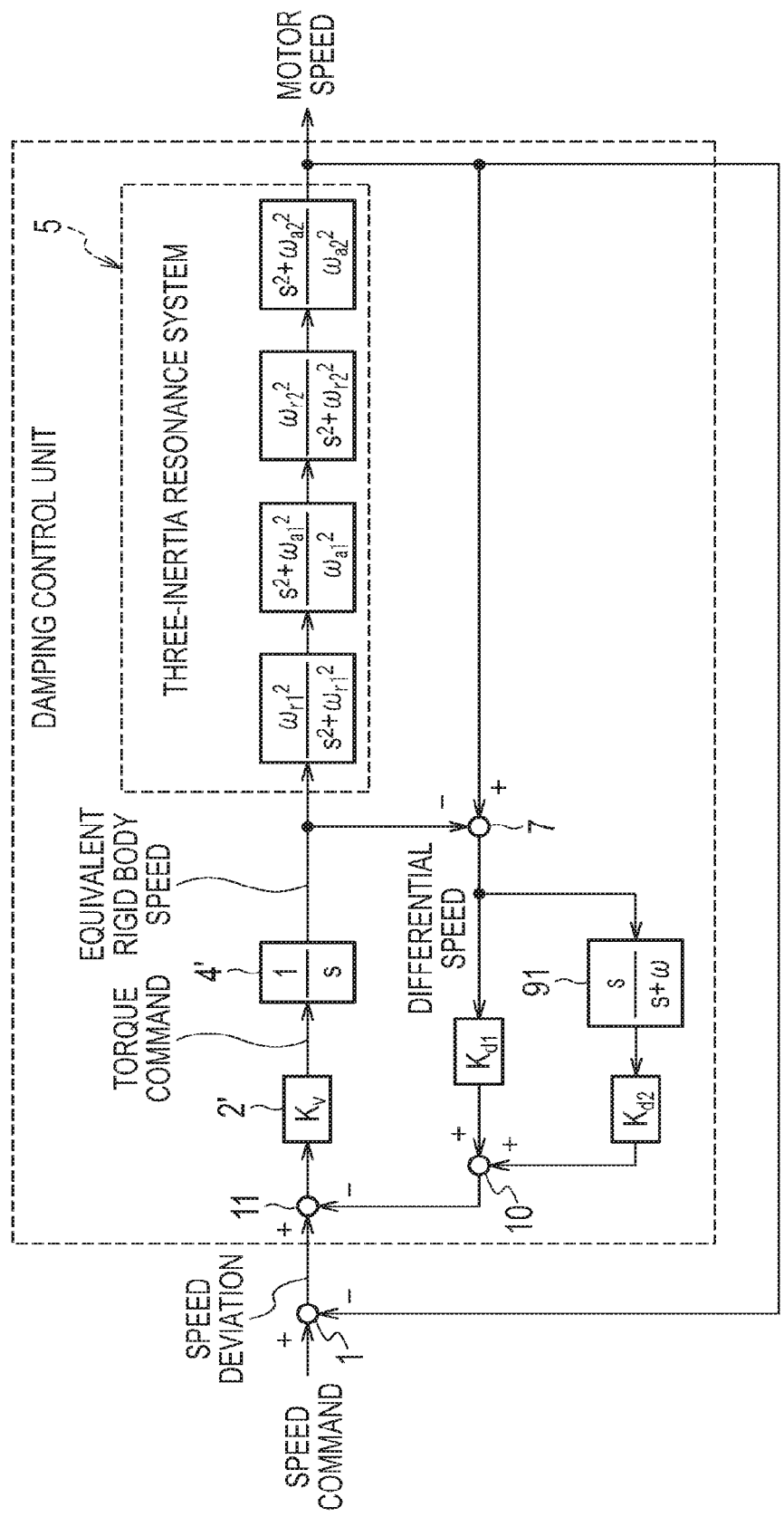
FIG. 6 is a control block diagram in the case of changing a differentiator of FIG. 5 to an approximate differentiator.

In FIG. 6, the transfer function of the open loop from the speed deviation to the output (the sum of each output obtained by multiplying the first differential speed by $K_{d1}$ and $K_{d2}$) of the damping control unit is expressed by the following formula.

$$G_{open} = \frac{\left(K_{d1}+K_{d2}\frac{s}{s+\omega}\right)K_v}{s}\left(\frac{s^2+\omega_{a1}^2}{s^2+\omega_{r1}^2}\cdot\frac{\omega_{r1}^2}{\omega_{a1}^2}\times\frac{s^2+\omega_{a2}^2}{s^2+\omega_{r2}^2}\cdot\frac{\omega_{r2}^2}{\omega_{a2}^2}-1\right) \quad (15)$$

$$= \frac{\left(K_{d1}+K_{d2}\frac{s}{s+\omega}\right)K_v}{s}\cdot\frac{s^2\left[\left(\frac{\omega_{r1}^2\omega_{r2}^2}{\omega_{a1}^2\omega_{a2}^2}-1\right)s^2+\left\{(\omega_{a1}^2+\omega_{a2}^2)\frac{\omega_{r1}^2\omega_{r2}^2}{\omega_{a1}^2\omega_{a2}^2}-(\omega_{r1}^2+\omega_{r2}^2)\right\}\right]}{(s^2+\omega_{r1}^2)(s^2+\omega_{r2}^2)}$$

Accordingly, the transfer function of the closed loop from the speed deviation to the motor speed is expressed as follows.

$$G_{close} = \frac{1}{1+G_{open}}\cdot\frac{K_v}{s}\cdot\frac{\omega_{r1}^2}{s^2+\omega_{r1}^2}\cdot\frac{s^2+\omega_{a1}^2}{\omega_{a1}^2}\cdot\frac{\omega_{r2}^2}{s^2+\omega_{r2}^2}\cdot\frac{s^2+\omega_{a2}^2}{\omega_{a2}^2} \quad (16)$$

$$= \frac{K_v}{s}\cdot\frac{s^2+\omega_{a1}^2}{\omega_{a1}^2}\cdot\frac{s^2+\omega_{a2}^2}{\omega_{a2}^2}\cdot\frac{\omega_{r1}^2\omega_{r2}^2(s+\omega)}{s^5+a_4''s^4+a_3''s^3+a_2''s^2+a_1''s+a_0''}$$

Here, $$a_4'' = (K_{d1}+K_{d2})K_v\left(\frac{\omega_{r1}^2\omega_{r2}^2}{\omega_{a1}^2\omega_{a2}^2}-1\right)+\omega \quad (17)$$

$$a_3'' = K_{d1}K_v\omega\left(\frac{\omega_{r1}^2\omega_{r2}^2}{\omega_{a1}^2\omega_{a2}^2}-1\right)+(\omega_{r1}^2+\omega_{r2}^2) \quad (18)$$

$$a_2'' = (K_{d1}+K_{d2})K_v\omega_{r1}^2\omega_{r2}^2\left(\frac{1}{\omega_{a1}^2}+\frac{1}{\omega_{a2}^2}\right)+ \quad (19)$$
$$(\omega_{r1}^2+\omega_{r2}^2)\left\{\omega-2\left(\frac{1}{\omega_{a1}^2}+\frac{1}{\omega_{a2}^2}\right)\right\}$$

$$a_1'' = \{K_{d1}K_v\omega\omega_{r1}^2\omega_{r2}^2-(\omega_{r1}^2+\omega_{r2}^2)\}\left(\frac{1}{\omega_{a1}^2}+\frac{1}{\omega_{a2}^2}\right)+\omega_{r1}^2\omega_{r2}^2 \quad (20)$$

$$a_0'' = \omega_{r1}^2\omega_{r2}^2\omega \quad (21)$$

In Formula (16), since the fifth-order coefficient of the denominator of the right side fourth term becomes 1, the aforementioned problem does not occur.

From Formulas (17) to (20), it is clear that $K_{d1}$ or $K_{d2}$ is included in the first-order to fourth-order terms in the characteristic polynomial of the right side fourth term of Formula (16). Therefore, there is a possibility that the control block of FIG. 6 can impart the full attenuation to the three-inertia resonance system (the expression "there is a possibility" is used, strictly, because the four coefficients need to be independently set with respect to four-orders).

Based on the above examination results, the actually applicable control block becomes a control system model of the present embodiment illustrated in FIG. 1. That is, as illustrated in FIG. 1, the equivalent rigid body speed is estimated by the speed estimator 6. Also, as it is clear from FIG. 1, the control system model of the present embodiment splits the signal from the output of the phase compensator 8 of the conventional damping control, and adds a signal obtained by multiplying the first feedback gain $K_{d2}$ through the approximate differentiator 91 to the output of the conventional damping control. Thus, the configuration of the control block of the present embodiment illustrated in FIG. 1 can perform the proper damping control on the three-inertia resonance system. Although a control of the speed P is employed in FIG. 1, it is possible to obtain the same effect, even when an integrator is added to the speed control feedback loop or position control is employed (not illustrated).

<Confirming Effect Through Simulation>

Figure 7:
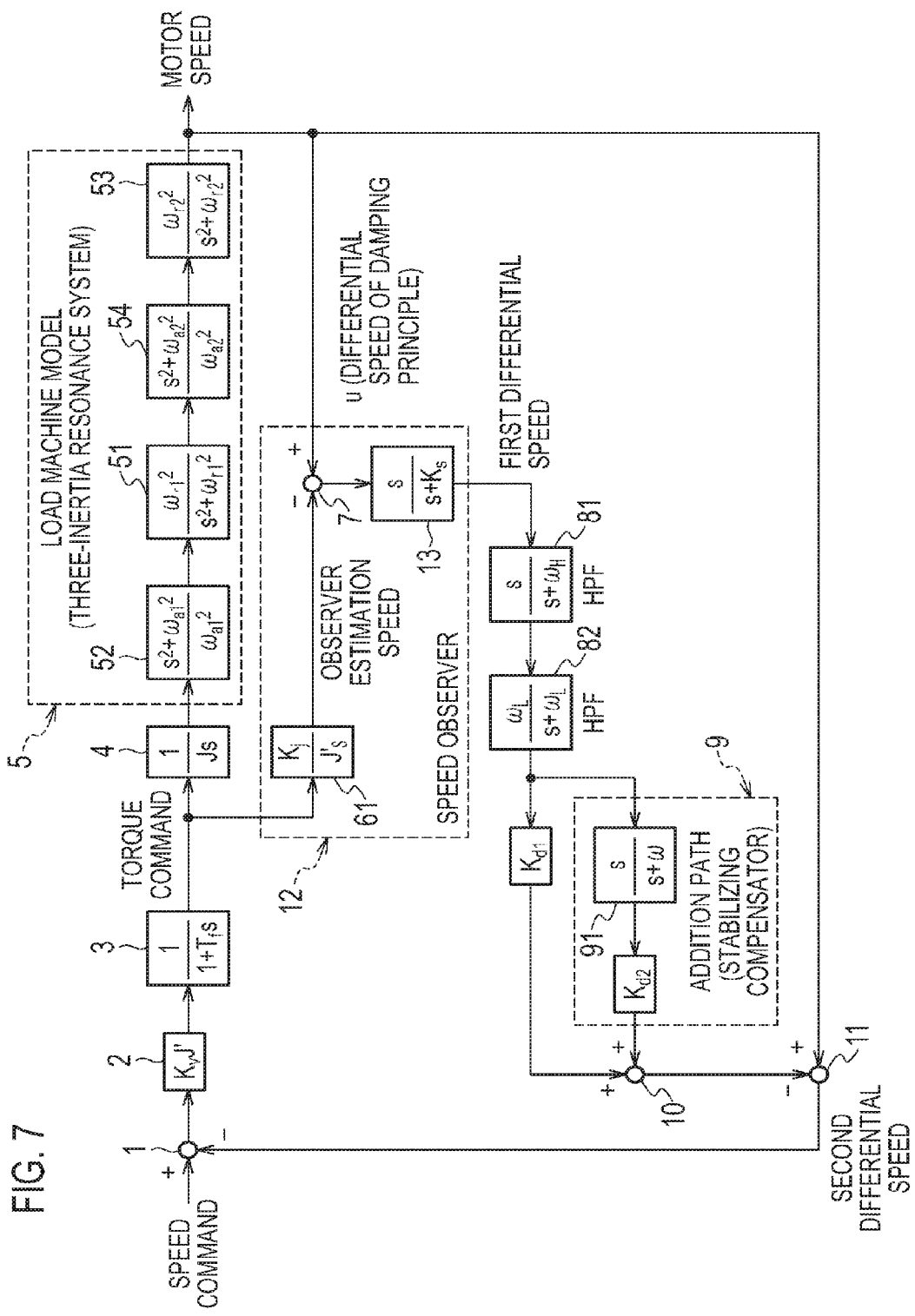
FIG. 7 is a control block diagram in which the control block diagram of FIG. 6 is rewritten in an actually applicable manner.
Figure 8:
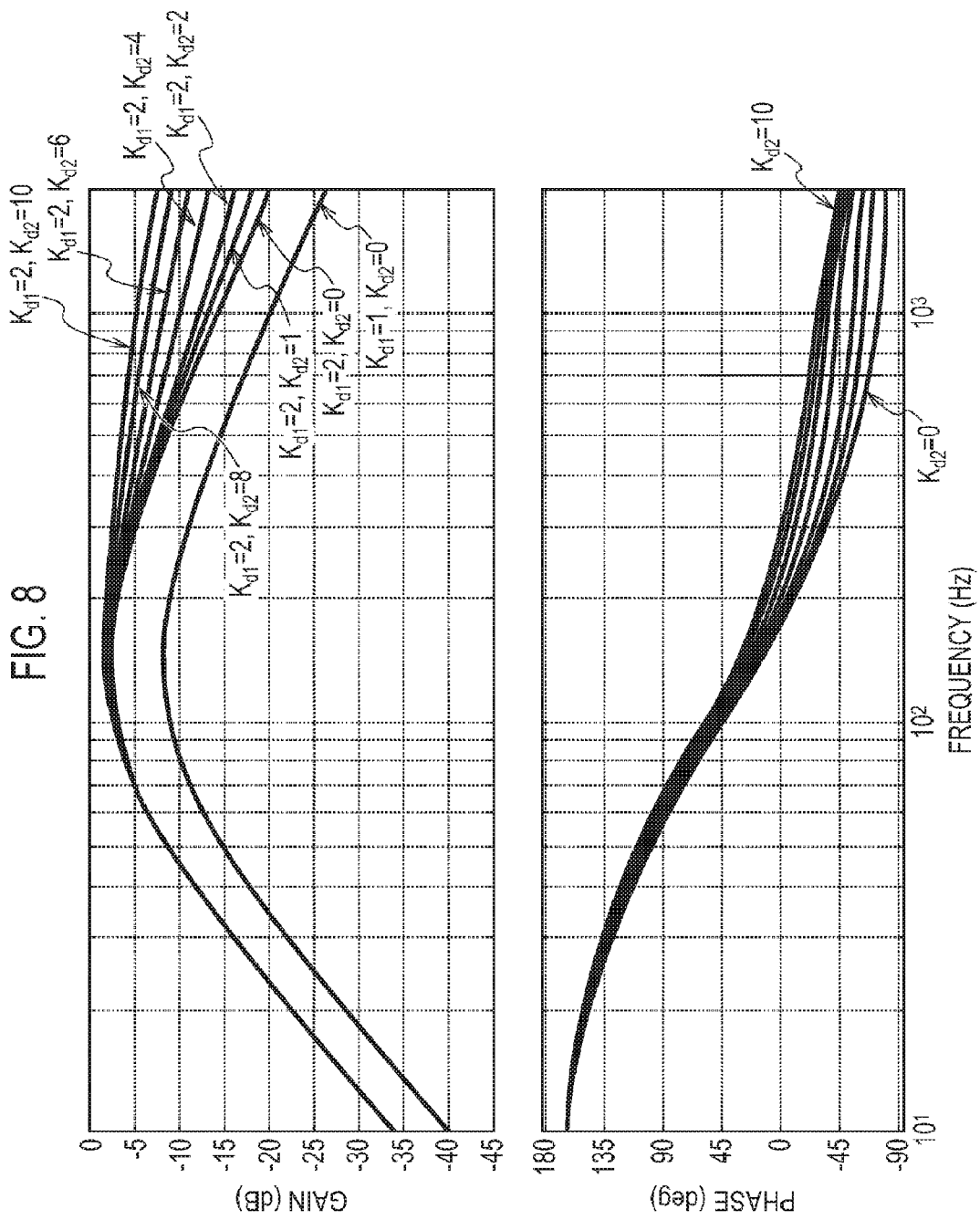
FIG. 8 is a Bode diagram of the frequency characteristics in which the speed command is set as an input and a calculation result of a first adder is set as an output in the present embodiment.
Figure 9:
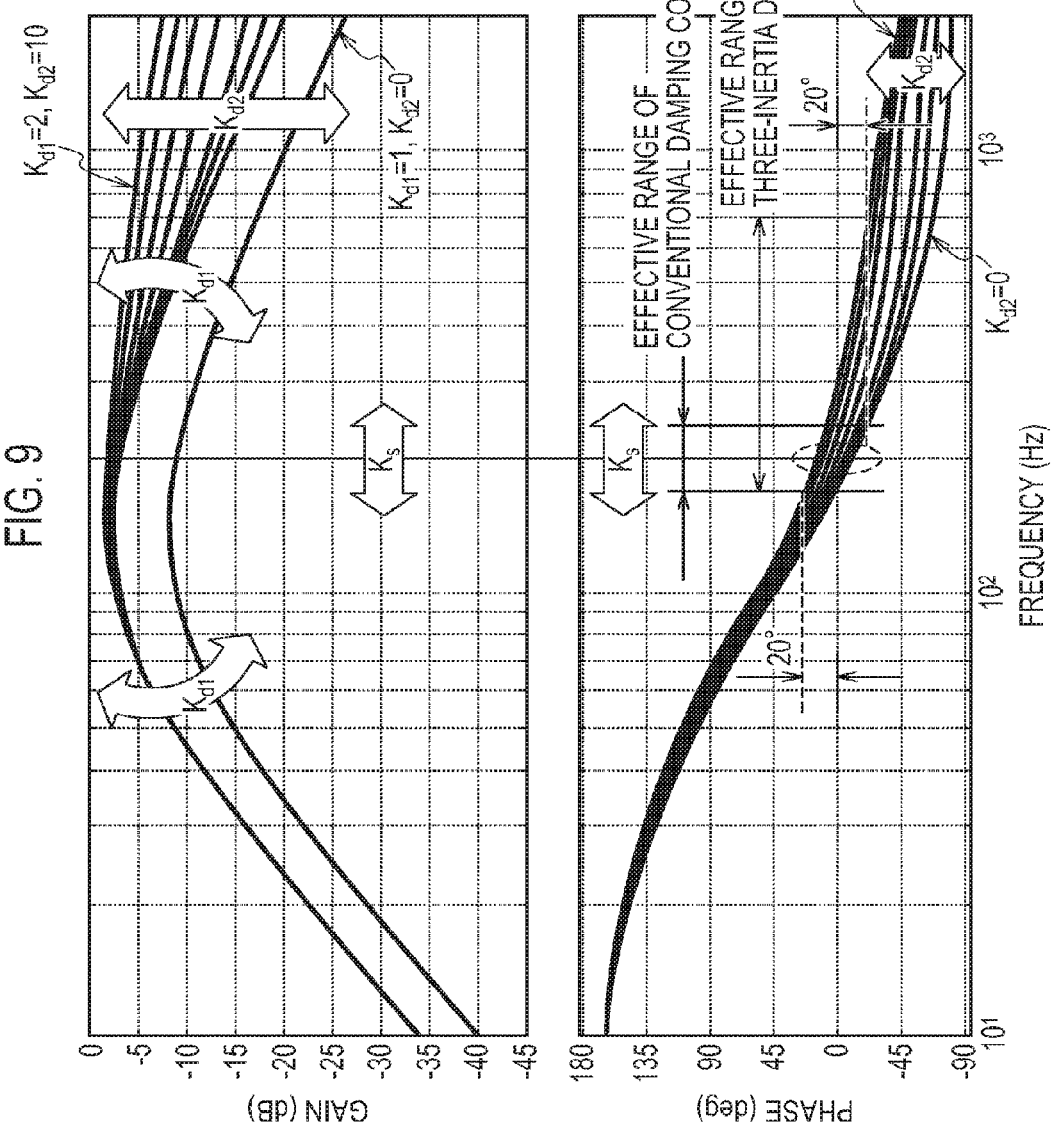
FIG. 9 is a diagram illustrating an influence of each parameter in the Bode diagram of FIG. 8.

The effect of the present embodiment is illustrated by the simulation results of FIGS. 8 to 39. First, in the control system model of FIG. 1, the integration of the speed estimator 6 and the second subtracter 7 maybe regarded as a speed observer 12 that outputs the first differential speed using the torque command and the motor speed as the input. When modifying the control block of the speed observer 12, FIG. 1 can be rewritten as in FIG. 7. As it is clear from FIG. 7, a first differential speed output by the speed observer 12 is regarded as a signal of the differential speed (an output signal u of the second subtracter 7 in FIG. 7) required for the damping principle passing through the first-order high-pass filter 13. FIGS. 8 and 9 illustrate the Bode diagrams of the frequency characteristics (equivalent to the frequency characteristics from the generation point of the first differential speed to an addition point between the output of the first feedback gain and the output of the stabilizing compensator) in the path from the differential speed u of the damping principle to the output signal y of the first adder 10. Further, the "gain" in the Bode diagrams of FIGS. 8 and 9 corresponds to an amplitude ratio between the input signal u and the output signal y of the open loop as a target (based on dB).

A curve corresponding to the second feedback gain $K_{d2}=0$ in FIG. 8 corresponds to the frequency characteristics of the conventional damping control. The frequency characteristics of the conventional damping control become a symmetrical mountain-shaped curve in view of a gain, and become a curve that decreases to a gentle curve in view of a phase. In contrast, by enhancing the second feedback gain $K_{d2}$ to enable the stabilizing compensator 9 of the present embodiment, the gain becomes higher to the right side from the mountain-shaped apex, that is, becomes higher than the conventional damping control over a wide band of the high-frequency side, and the phase delay decreases.

In FIG. 9 that is a Bode diagram of the same frequency characteristics, in the curve of the gradual phase, the vicinity of the phase of 0° is a frequency capable of significantly suppressing the vibration. The phase characteristics change at the cut-off frequency of the speed estimator 6. The phase characteristics of the cut-off frequency are variable at the adjustment gain Ks. Further, since the high gain is desired in the vicinity of a phase 0°, a phase compensator 8 is adjusted so that the gain characteristics become a hill shape in the vicinity of a phase 0°. Further, FIG. 9 illustrates a state in which the adjustment gain Ks is fixed at approximately 200 Hz.

Further, the height of the mountain-shaped curve of the gain can be adjusted and set by the first feedback gain $K_{d1}$. Also, a degree to which the gain increases on the high-frequency side from the apex of the mountain-shaped curve of the gain, and a degree to which a change in phase decreases on the high-frequency side from the vicinity of the phase 0 of the curve with the gradual phase can be adjusted and set by the second feedback gain $K_{d2}$. Thus, by suitably greatly setting the second feedback gain $K_{d2}$, it is possible to ensure the sufficiently greater gain and the sufficiently smaller phase as compared to the case of the conventional damping control (in the case of $K_{d2}$=0), thereby widely setting the effective band capable of removing the resonance vibration components from the motor speed (the phase is allowed to be empirically within about ±20°. By widely setting the effective band to fit each anti-resonance point of the three-inertia resonance system and the band of the resonance point, it is possible to appropriately suppress the vibration components, that is, it is possible to enhance the response by greatly setting the speed feedback gain Kv to that extent. Further, the cut-off frequency of the phase adjusting high-pass filter 81 in the phase compensator 8 is set to be lower than the adjustment gain Ks, and the cut-off frequency of the phase adjusting low-pass filter 82 is set to be higher than the adjustment gain Ks.

FIGS. 10 to 39 illustrate a comparison of the simulation results of the case of not performing the damping control, of the case of performing the conventional damping control, of the case of performing the dual conventional damping control, and of the case of performing the damping control of the present embodiment, on the control target of the specific five examples each having a resonance system.

Figure 10:
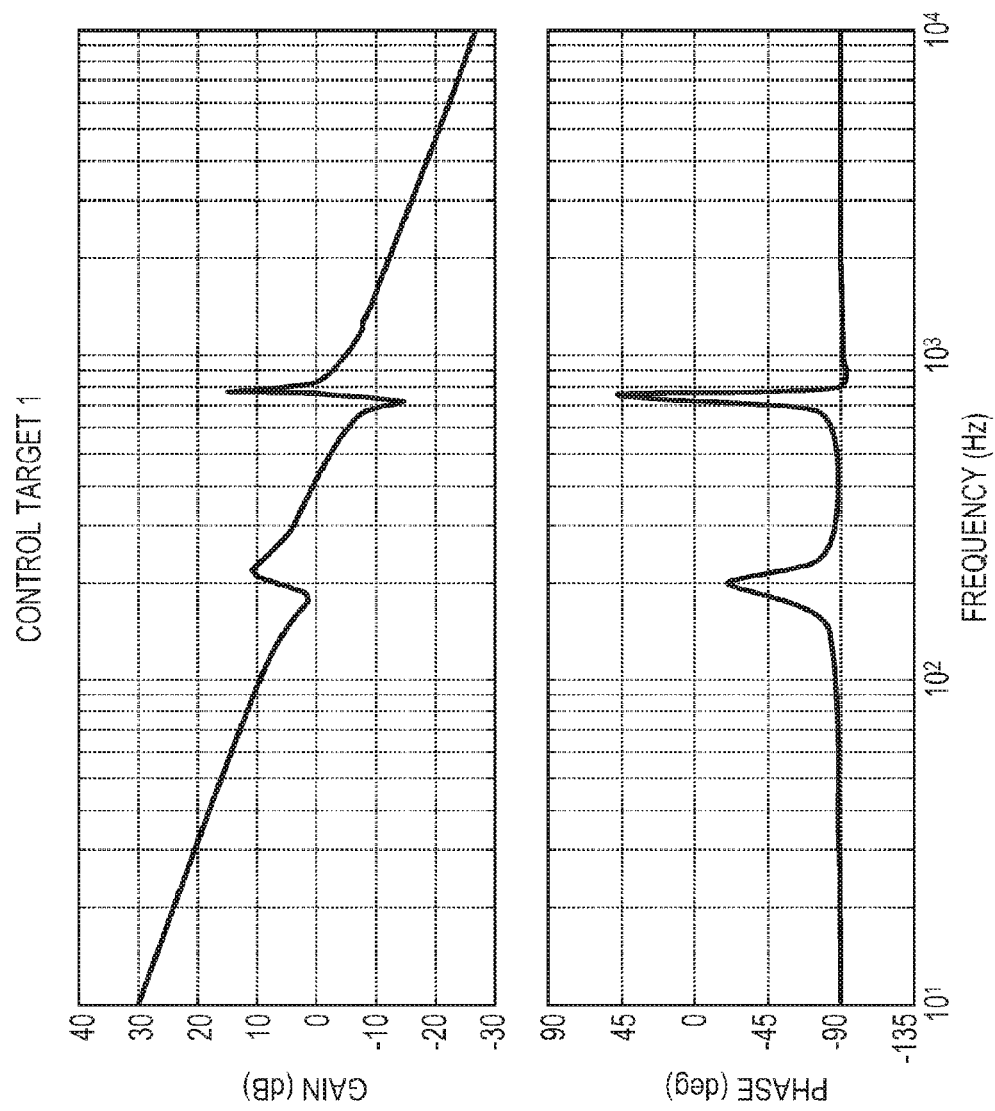
FIG. 10 is an example of the frequency characteristics of a control target 1 having a three-inertia resonance system.
Figure 11:
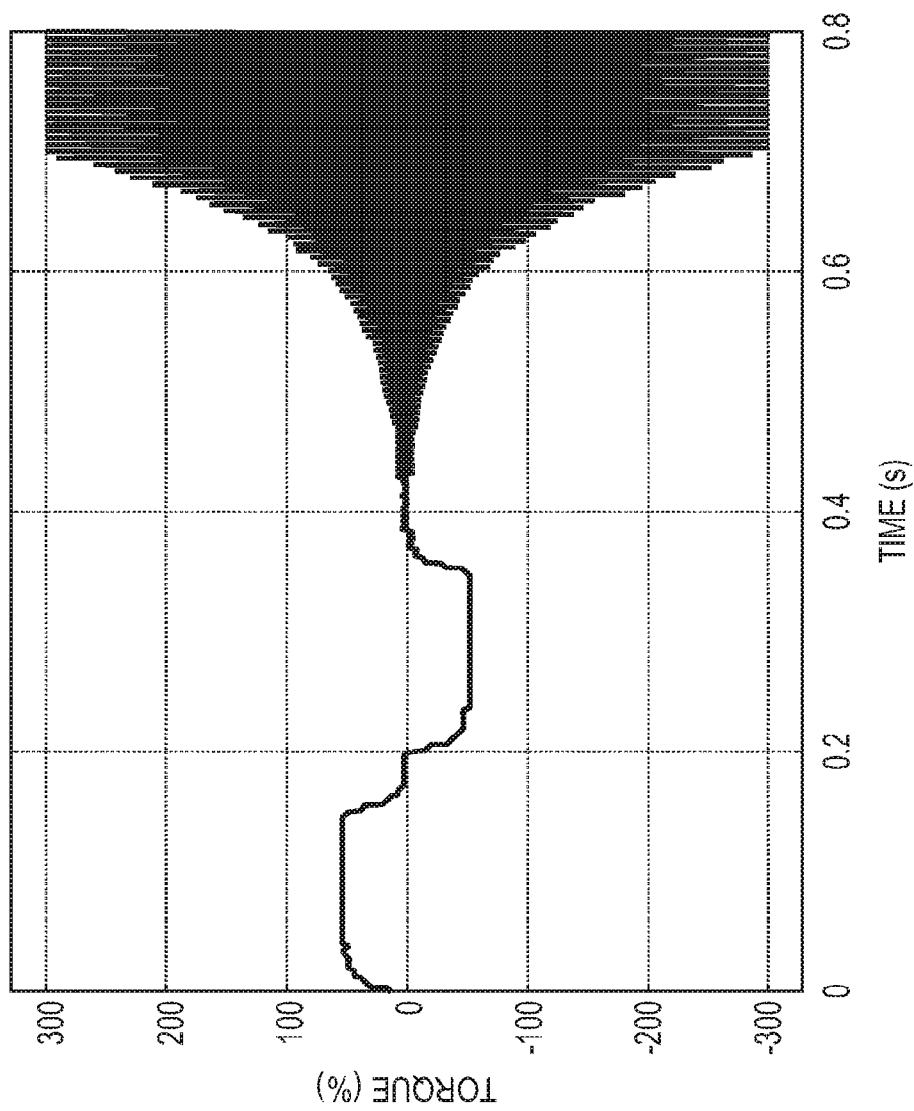
FIG. 11 is a diagram illustrating a simulation result of a time response of a torque command in the case of not performing the damping control on the control target 1.
Figure 12:
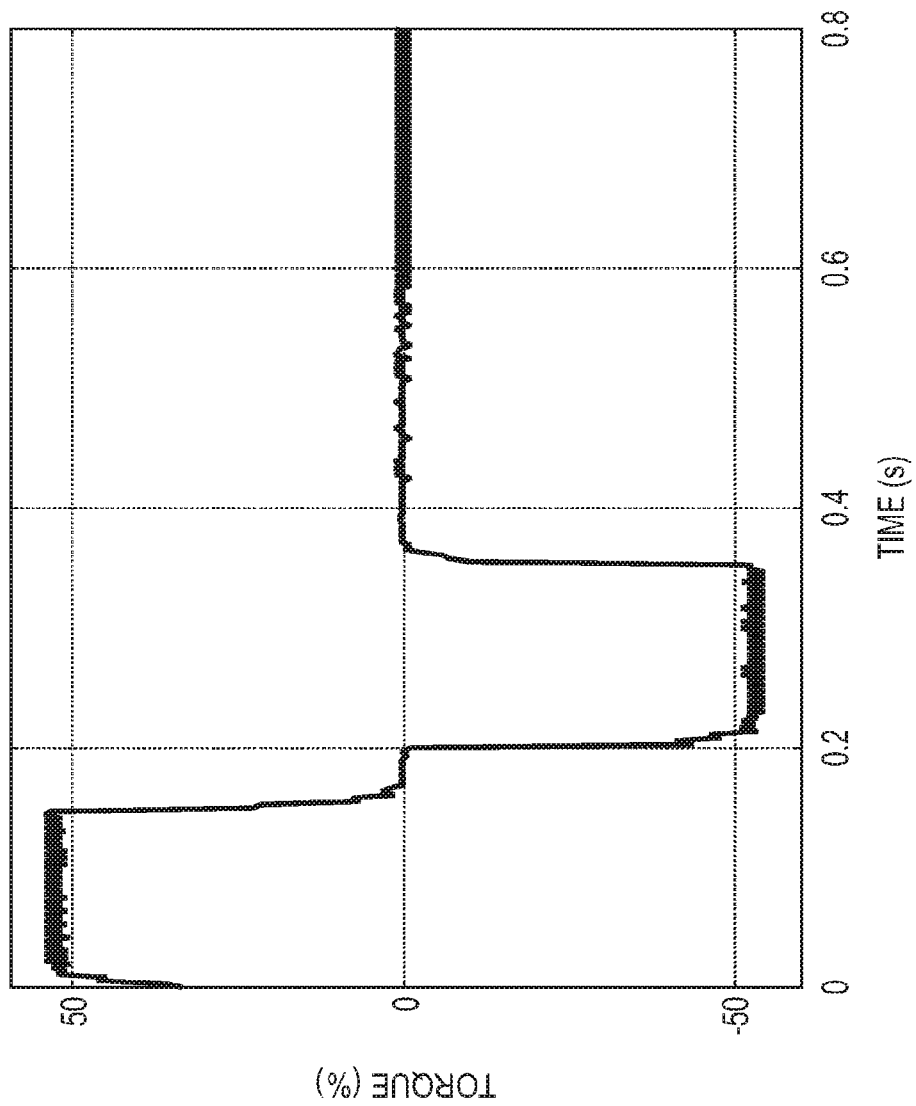
FIG. 12 is a diagram illustrating a simulation result of a time response of a torque command in the case of performing the conventional damping control on the control target 1.
Figure 13:
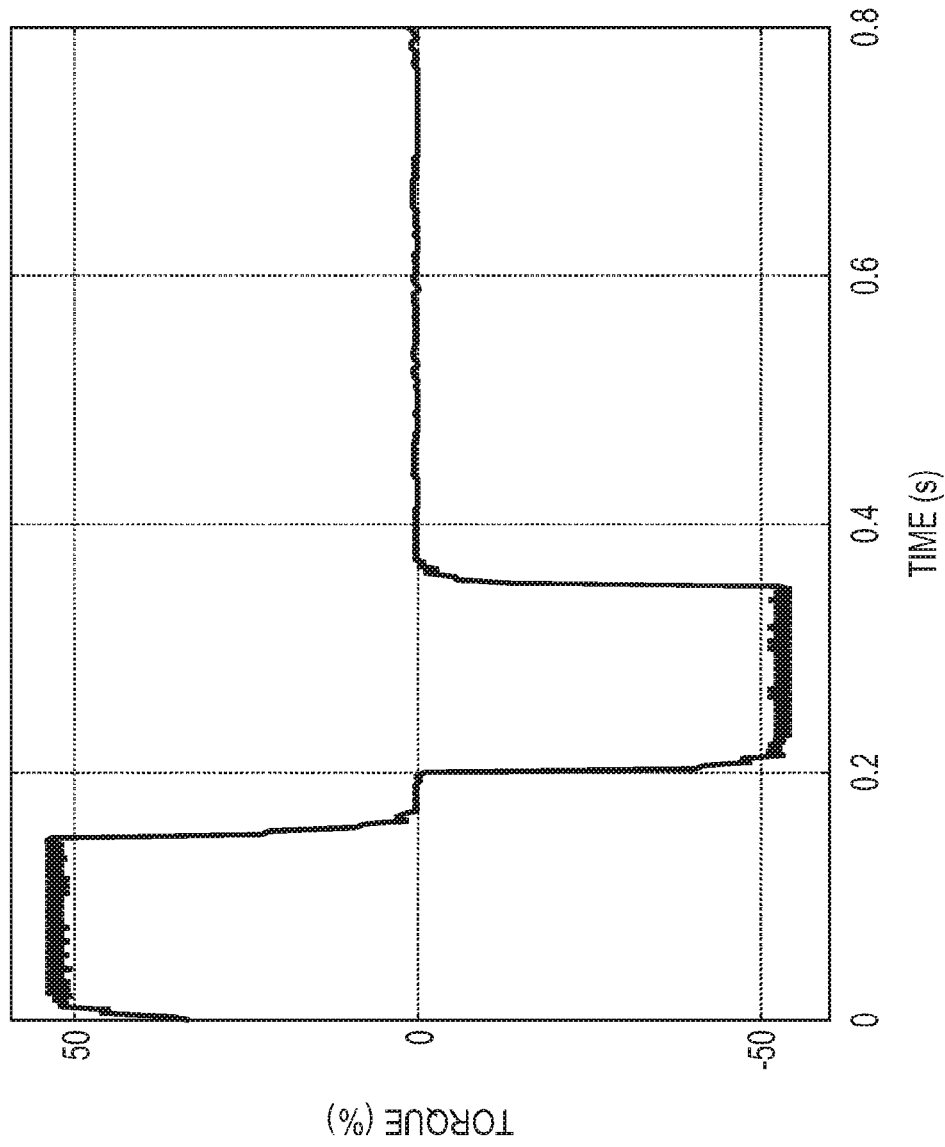
FIG. 13 is a diagram illustrating a simulation result of a time response of a torque command in the case of performing the three-inertia damping control on the control target 1.
Figure 14:
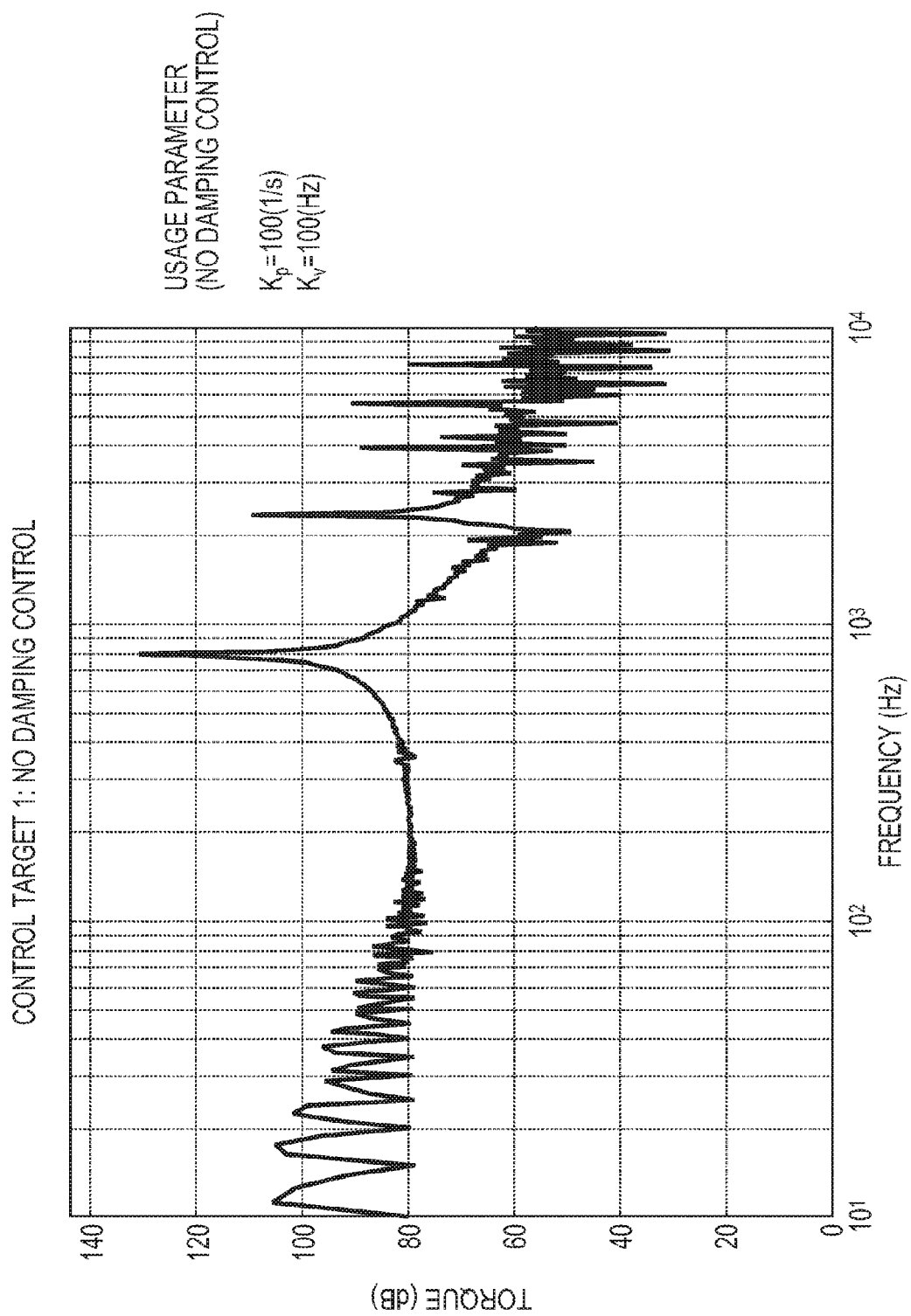
FIG. 14 is a diagram illustrating a simulation result of frequency characteristics of an output torque in the case of not performing the damping control on the control target 1.
Figure 15:
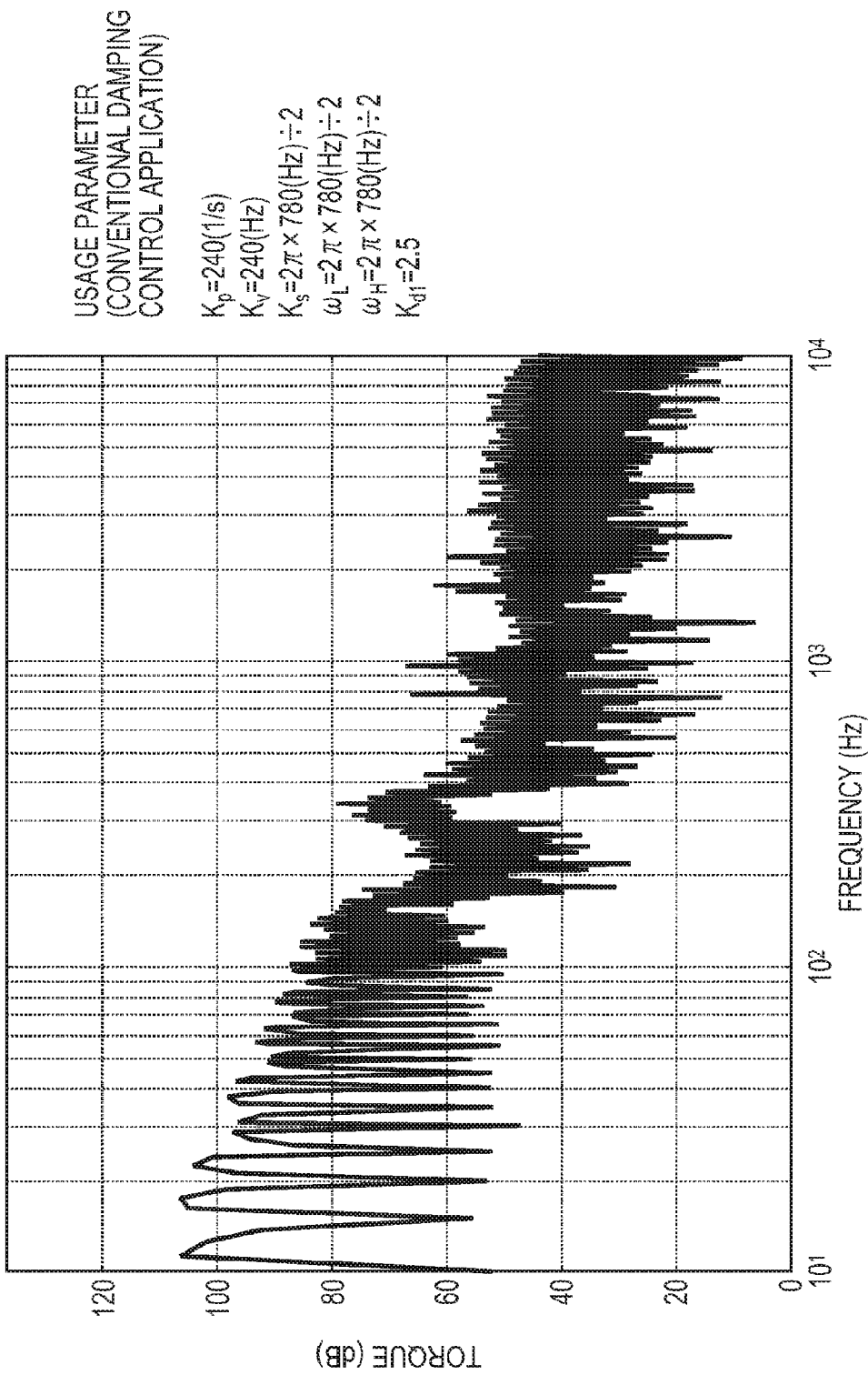
FIG. 15 is a diagram illustrating a simulation result of the frequency characteristics of the output torque in the case of performing the conventional damping control on the control target 1.
Figure 16:
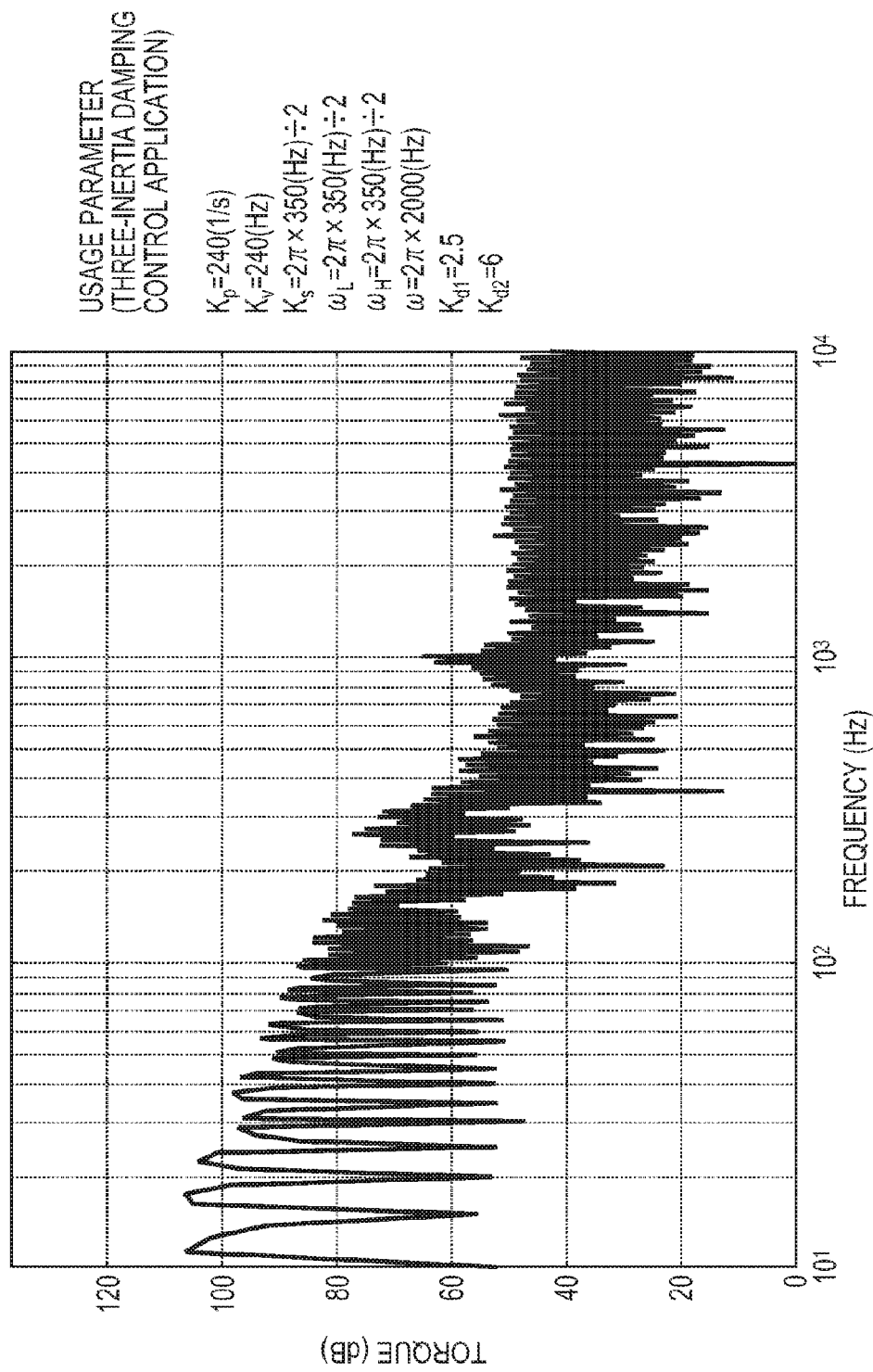
FIG. 16 is a diagram illustrating a simulation result of the frequency characteristics of the output torque in the case of performing three-inertia damping control on the control target 1.
Figure 17:
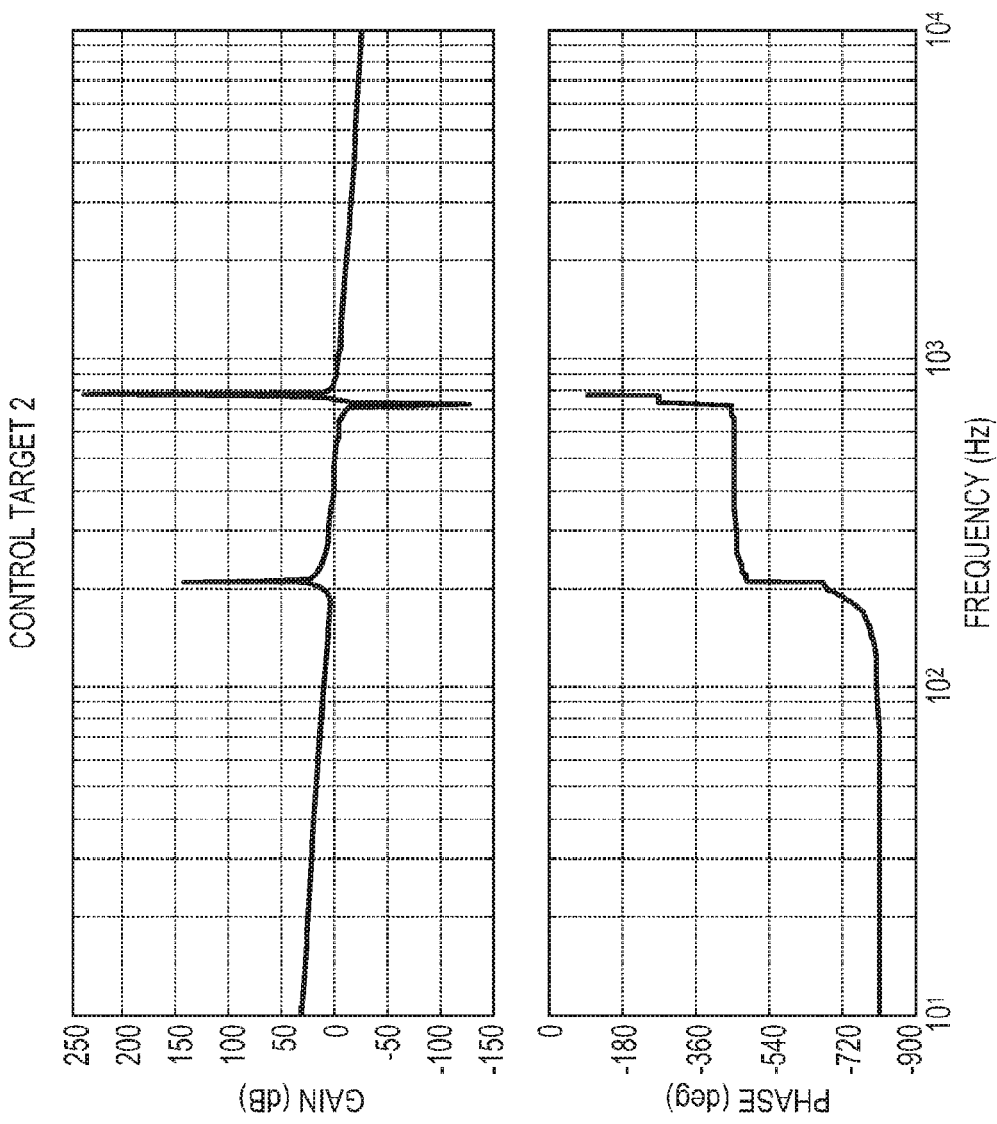
FIG. 17 is an example of the frequency characteristics of a control target 2 having a three-inertia resonance system.
Figure 18:
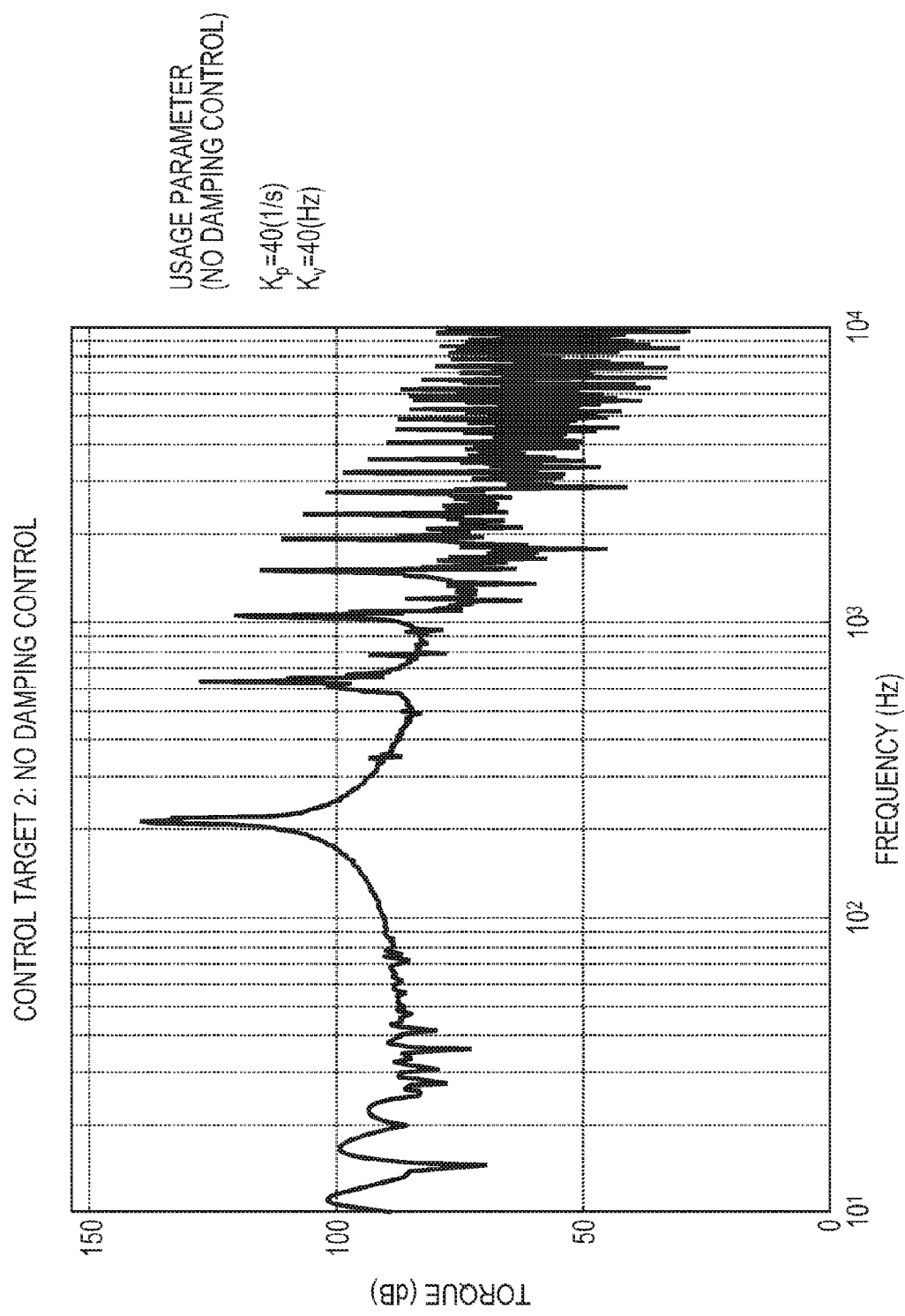
FIG. 18 is a diagram illustrating a simulation result of the frequency characteristics of the output torque in the case of not performing the damping control on the control target 2.
Figure 19:
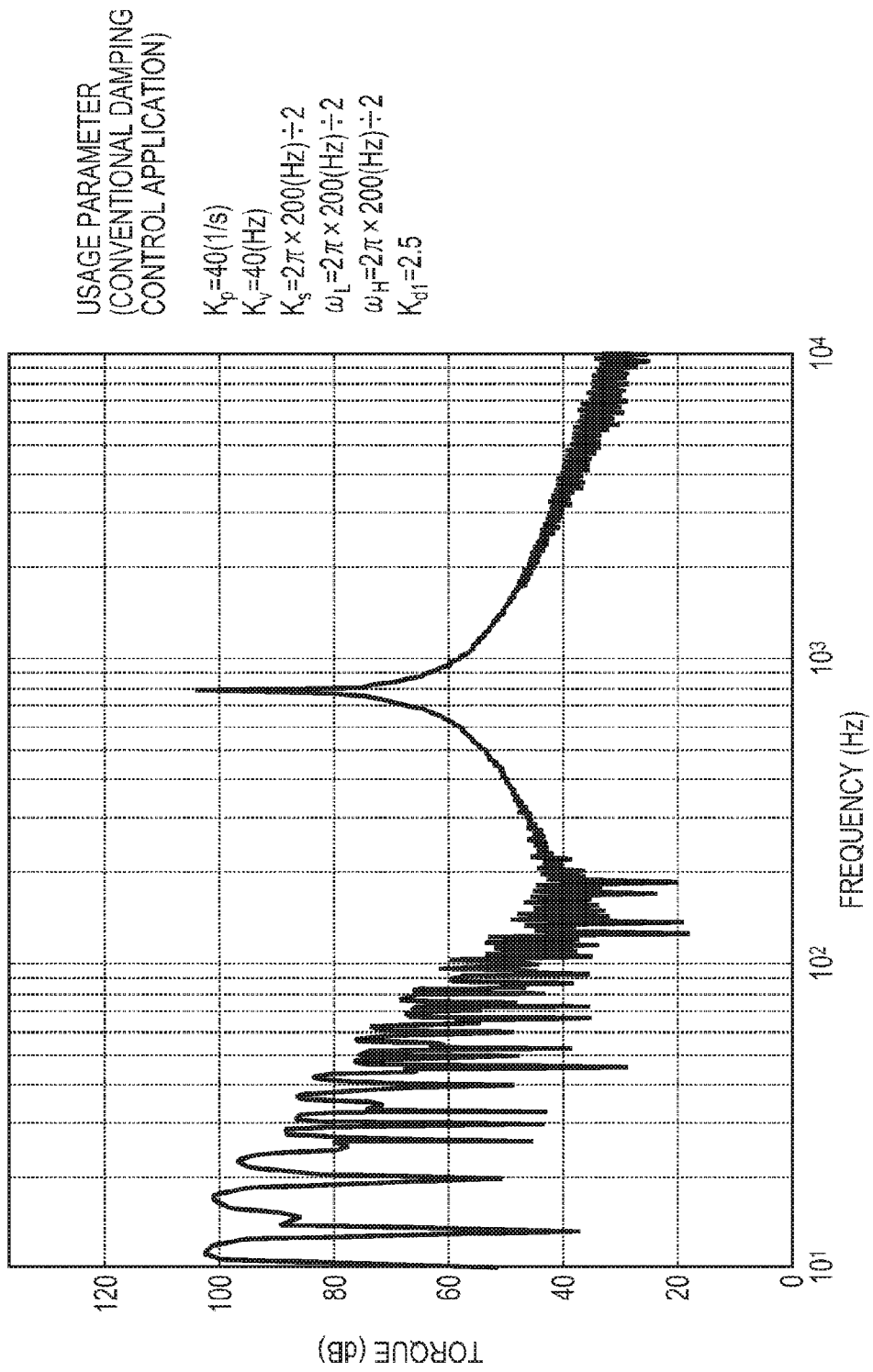
FIG. 19 is a diagram illustrating a simulation result of the frequency characteristics of the output torque in the case of performing the conventional damping control on the control target 2.
Figure 20:
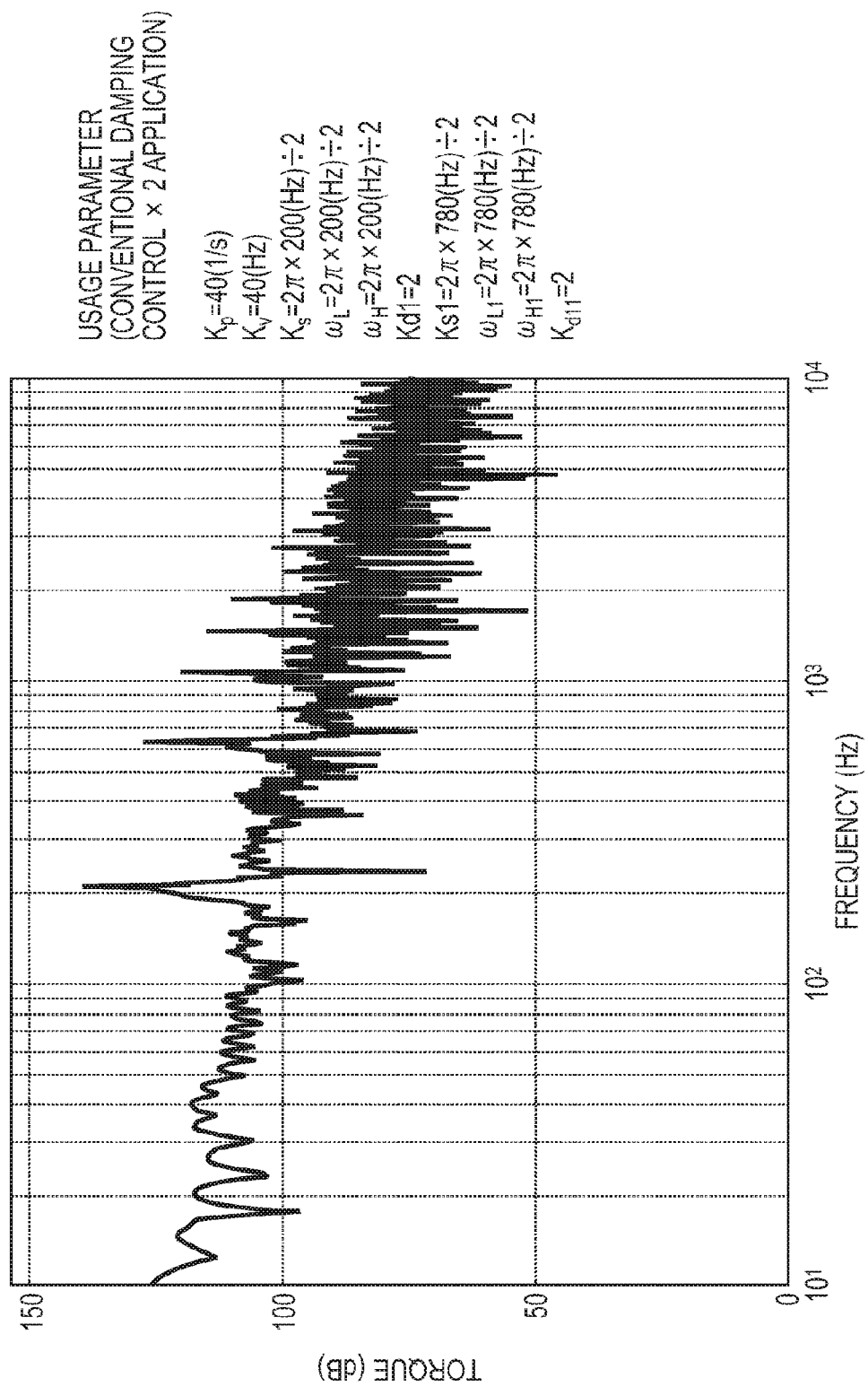
FIG. 20 is a diagram illustrating a simulation result of the frequency characteristics of the output torque in the case of performing the dual conventional damping control on the control target 2.
Figure 21:
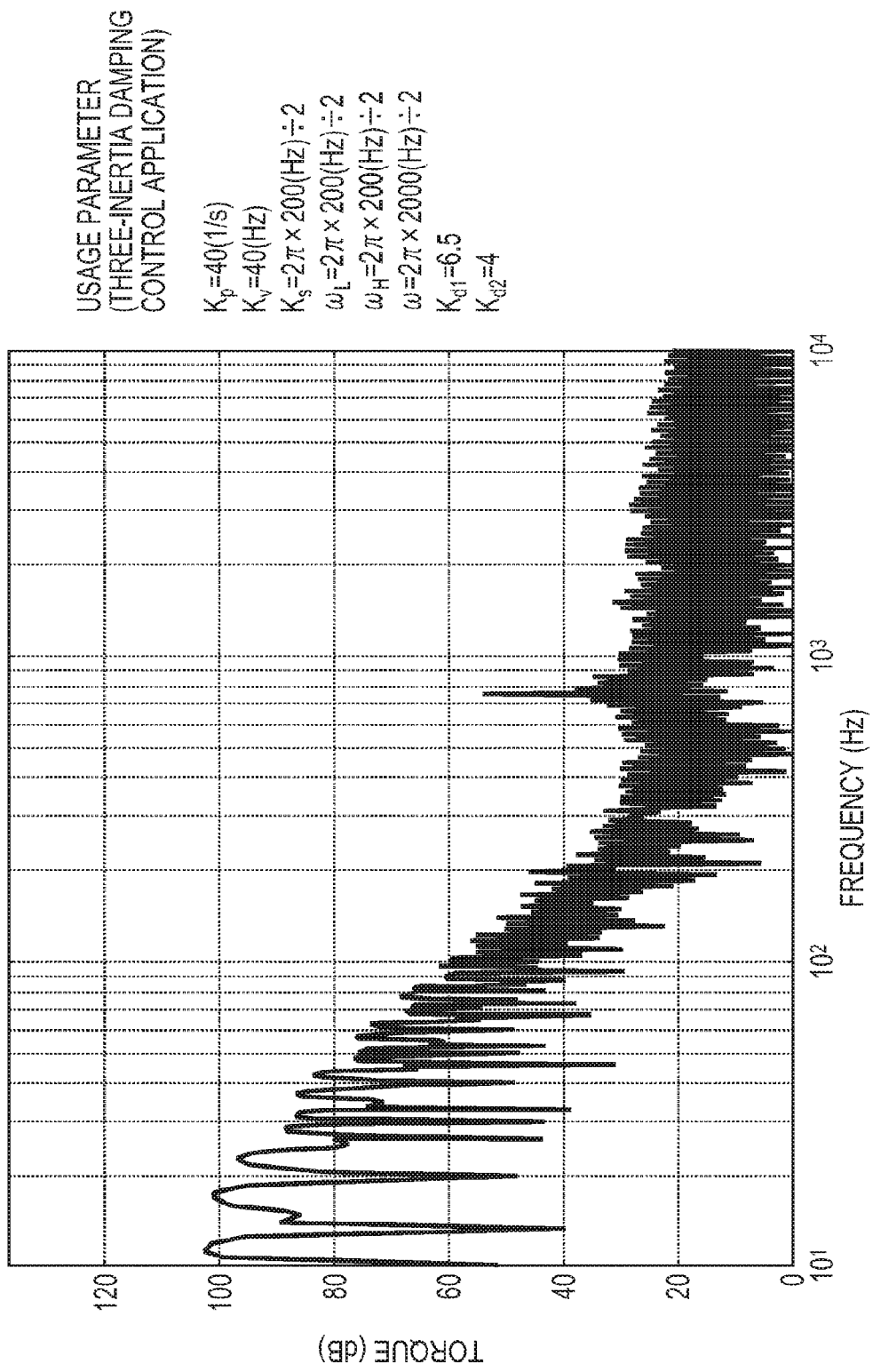
FIG. 21 is a diagram illustrating a simulation result of the frequency characteristics of the output torque in the case of performing the three-inertia damping control on the control target 2.
Figure 22:
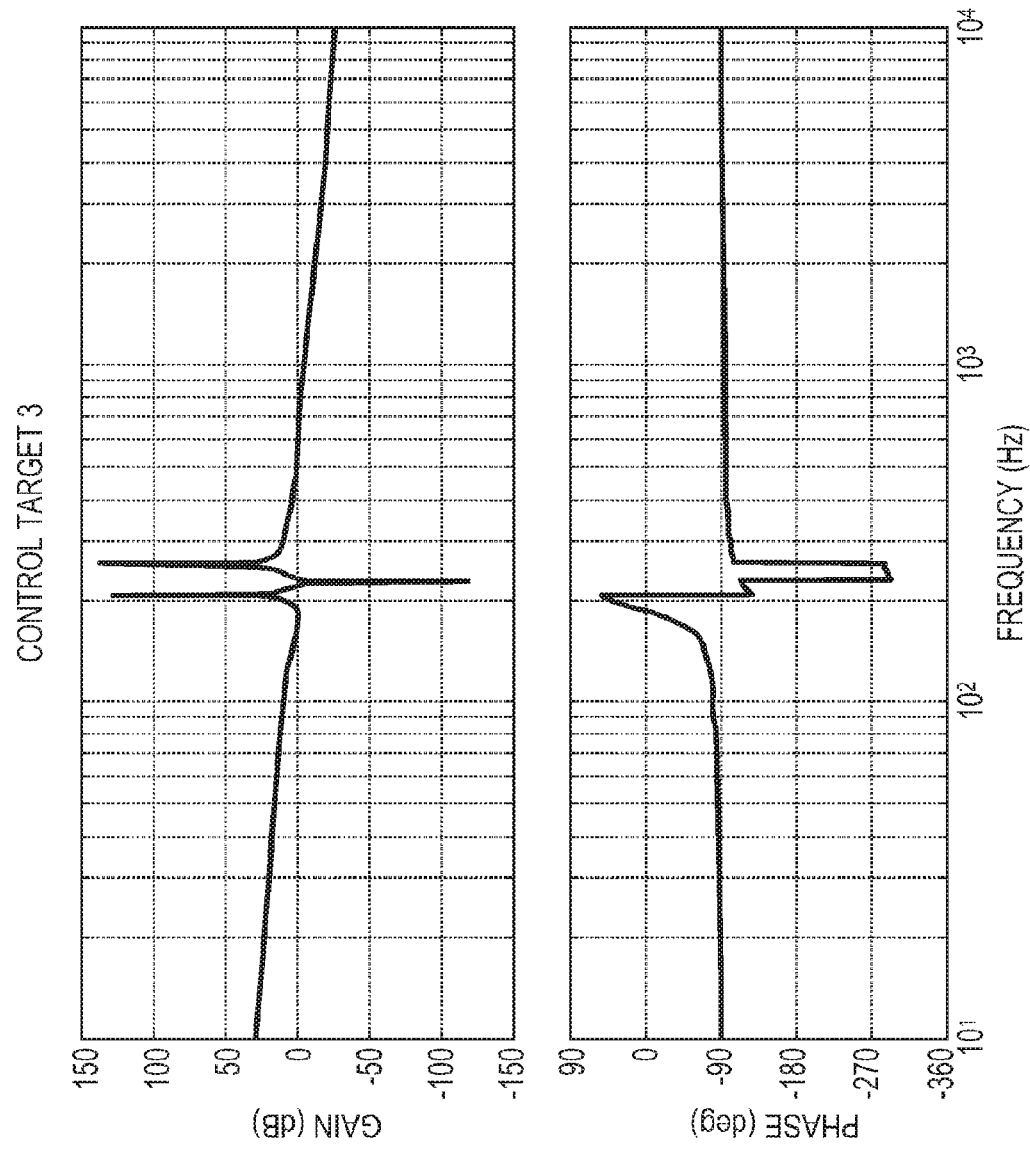
FIG. 22 is an example of the frequency characteristics of a control target 3 having a three-inertia resonance system.
Figure 26:
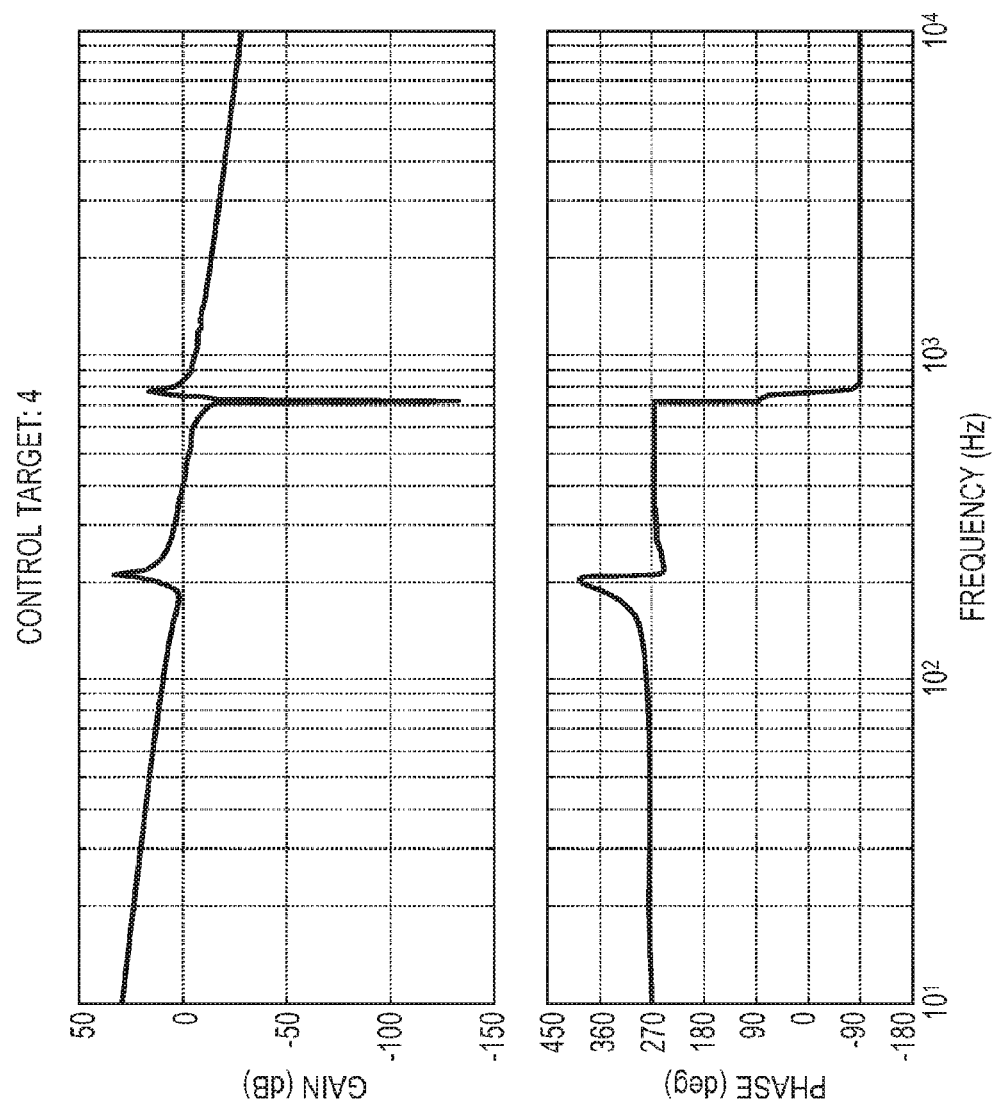
FIG. 26 is an example of the frequency characteristics of a control target 4 having a three-inertia resonance system.
Figure 27:
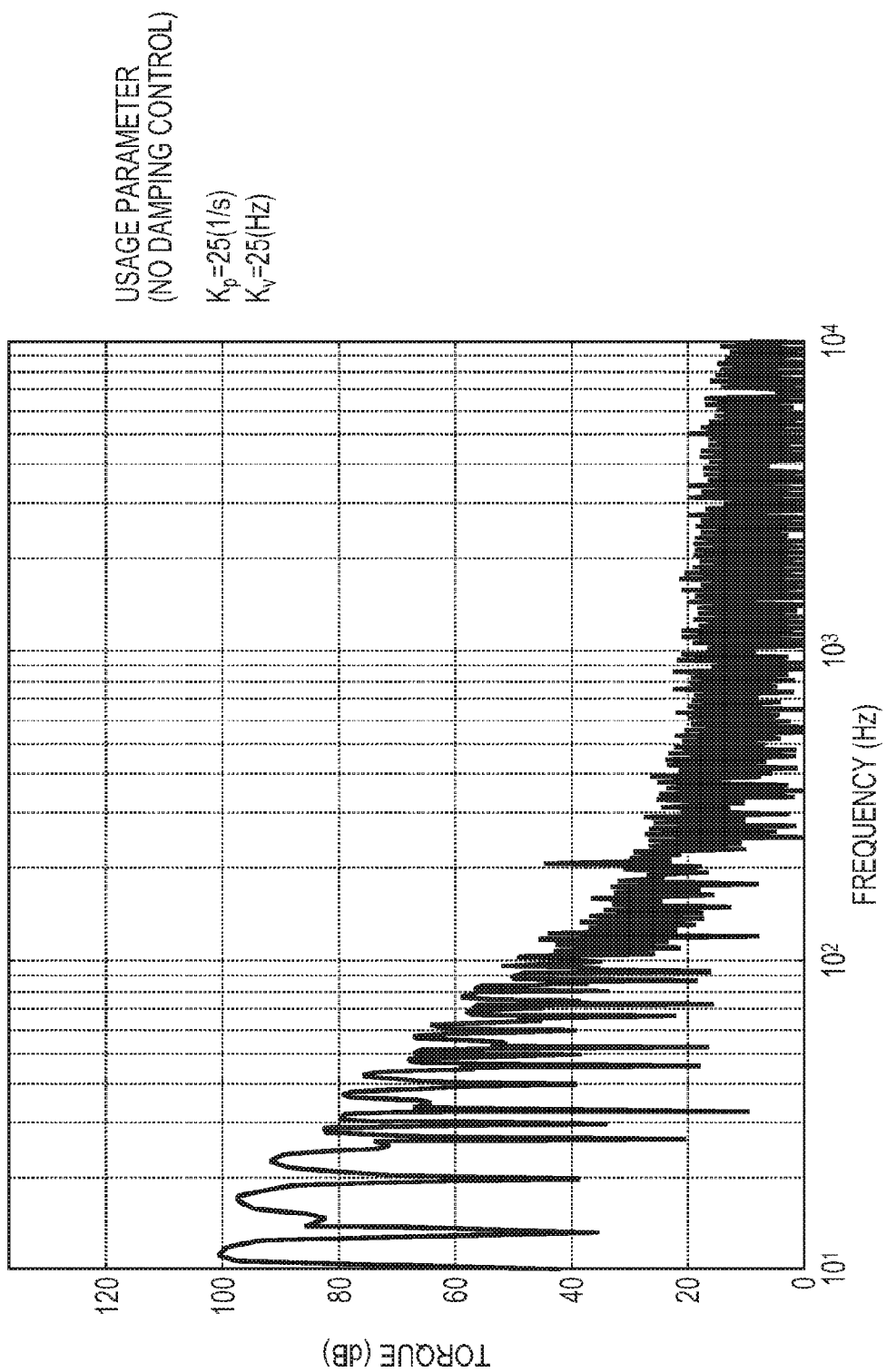
FIG. 27 is a diagram illustrating a simulation result of the frequency characteristics of the output torque in the case of not performing the damping control on the control target 4.
Figure 28:
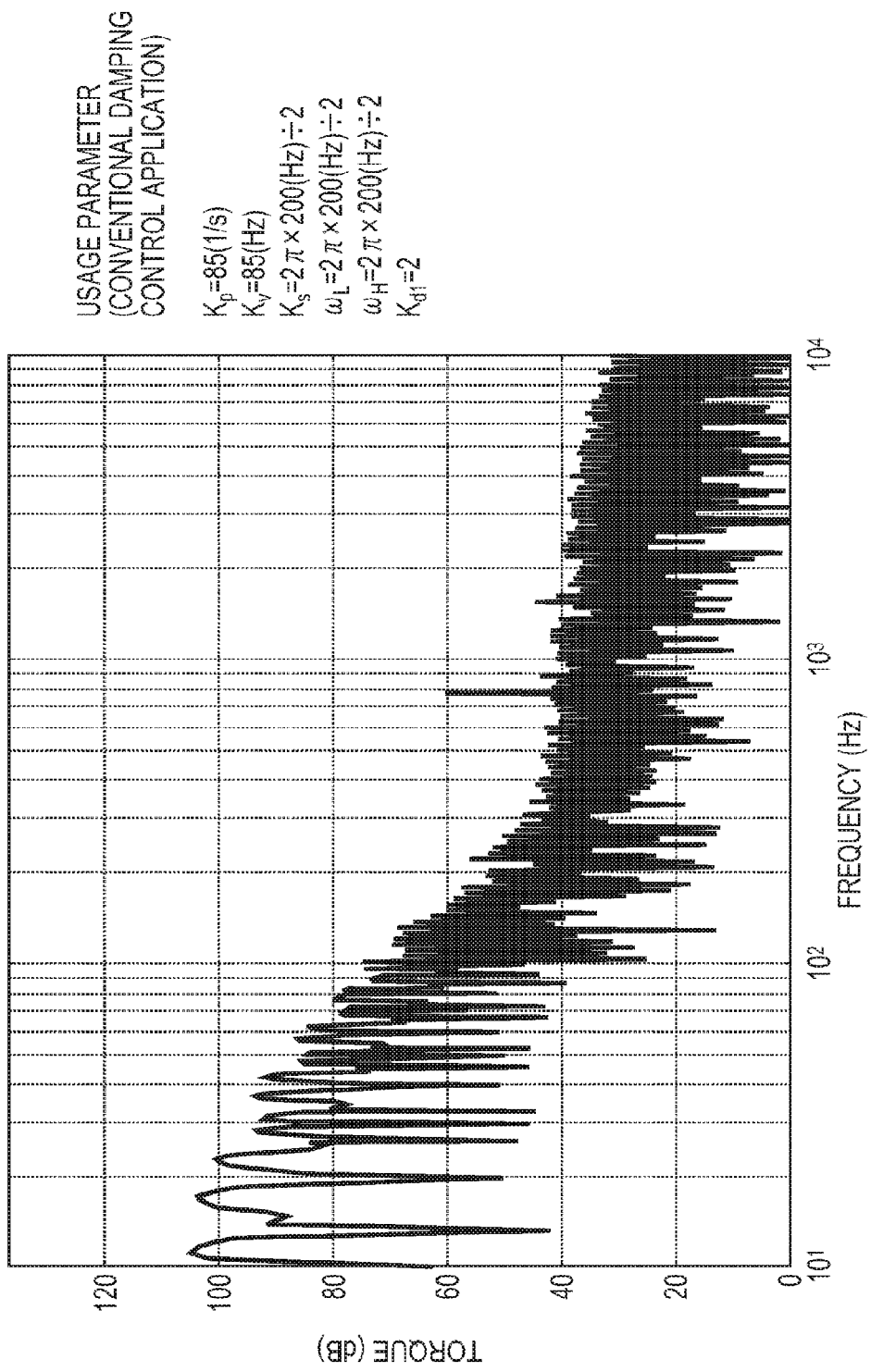
FIG. 28 is a diagram illustrating a simulation result of the frequency characteristics of the output torque in the case of performing the conventional damping control on the control target 4.
Figure 29:
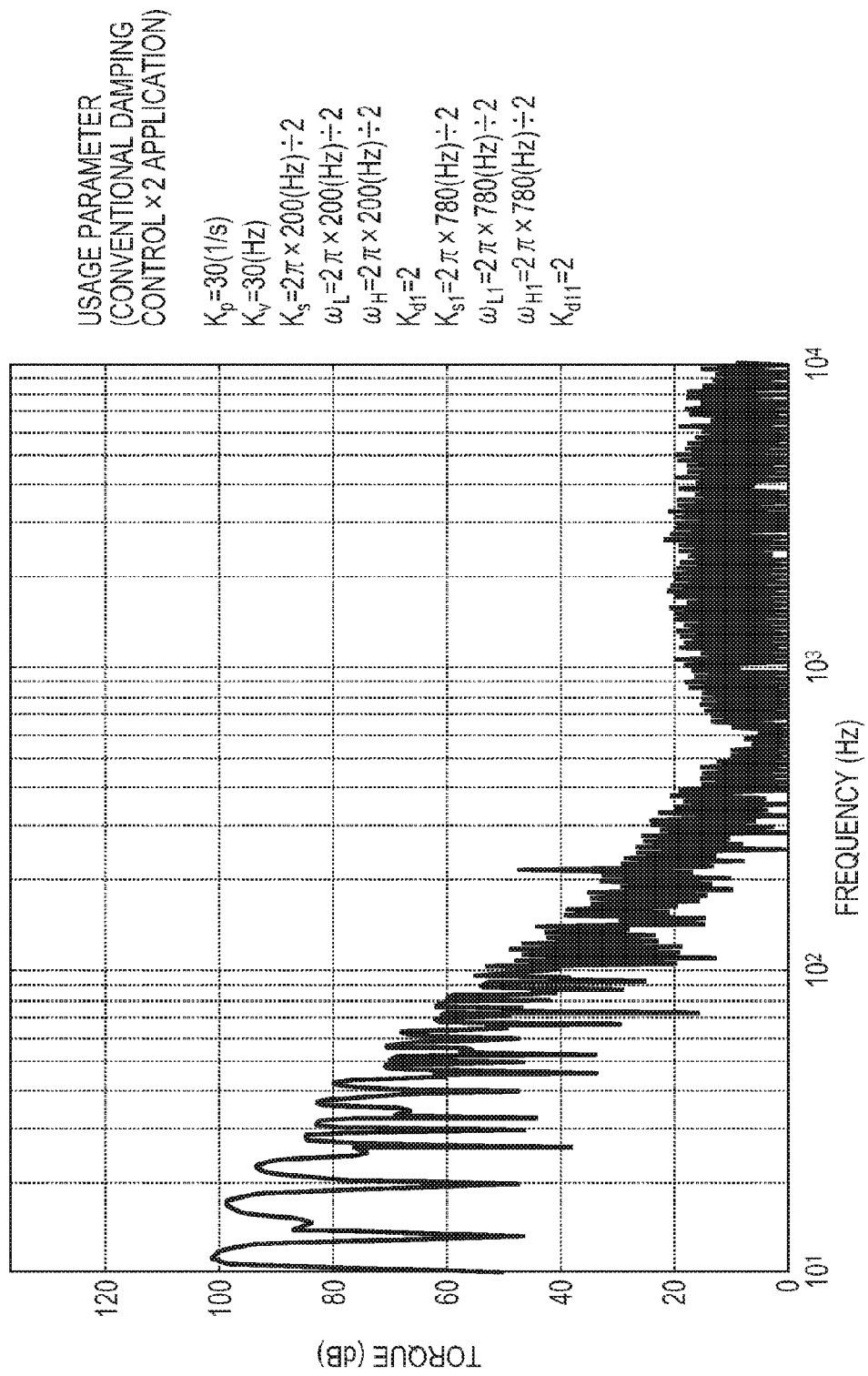
FIG. 29 is a diagram illustrating a simulation result of the frequency characteristics of the output torque in the case of performing the dual conventional damping control on the control target 4.
Figure 30:
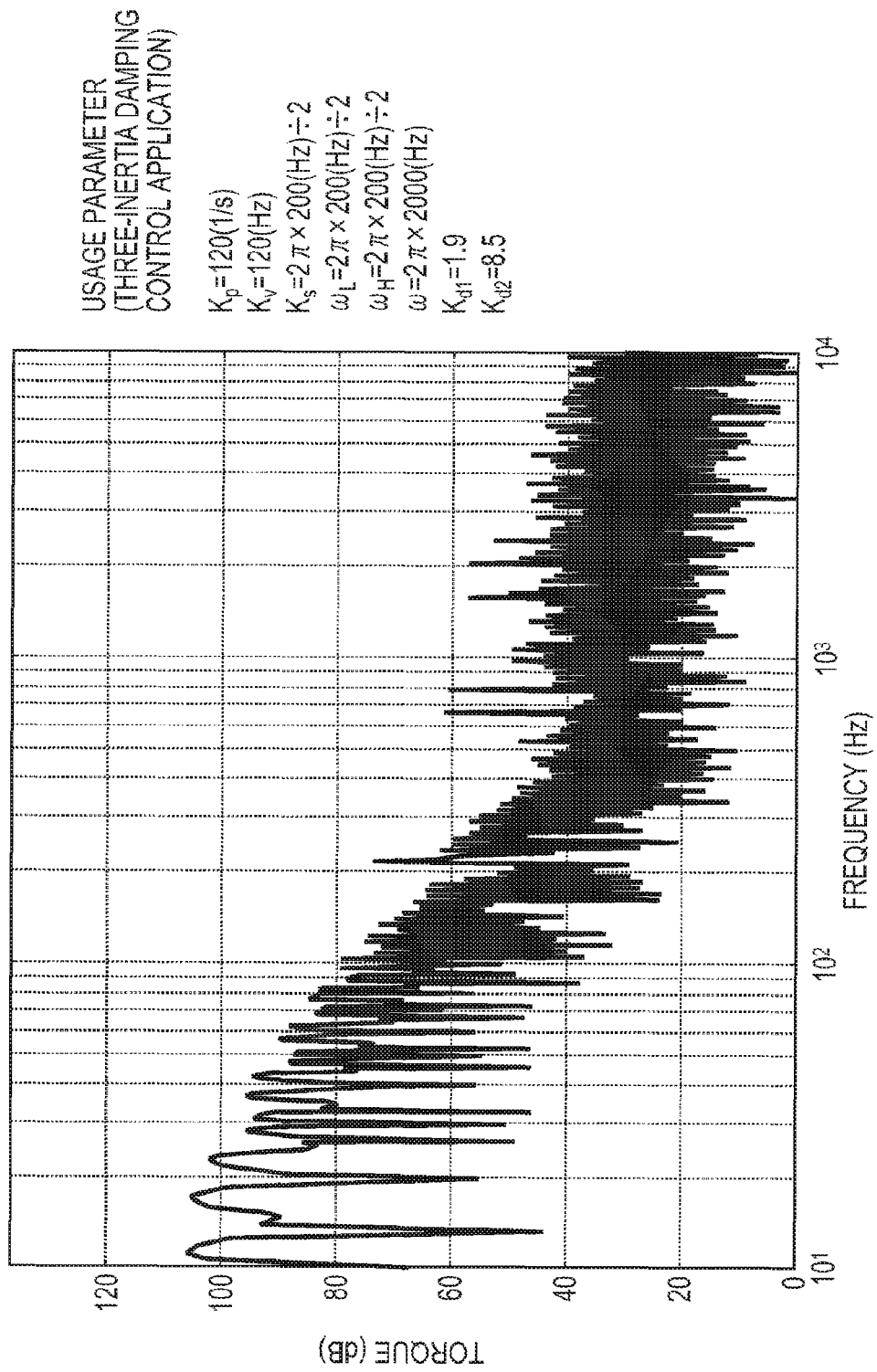
FIG. 30 is a diagram illustrating a simulation result of the frequency characteristics of the output torque in the case of performing a three-inertia damping control on the control target 4.
Figure 31:
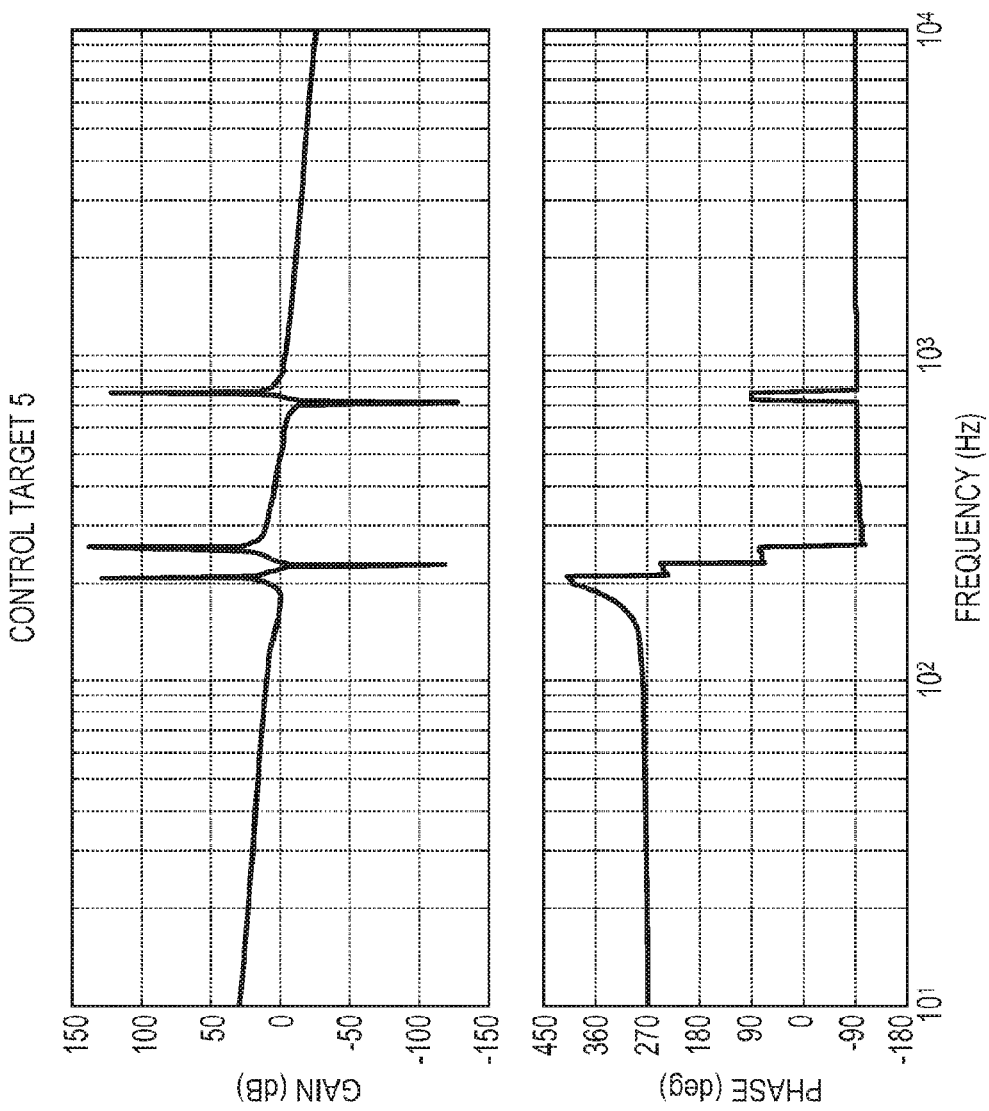
FIG. 31 is an example of the frequency characteristics of a control target 5 having a four-inertia resonance system.
Figure 32:
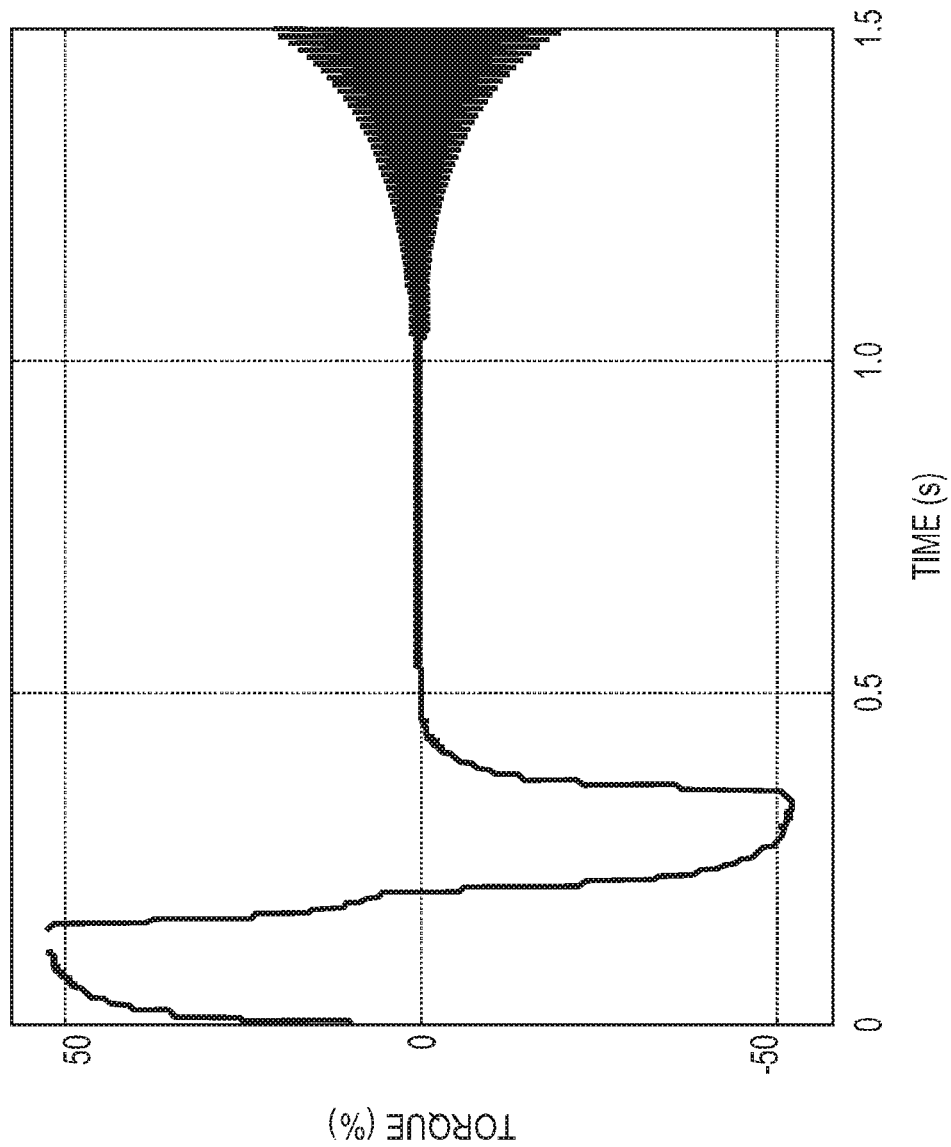
FIG. 32 is a diagram illustrating a simulation result of a time response of a torque command in the case of not performing the damping control on a control target 5.
Figure 33:
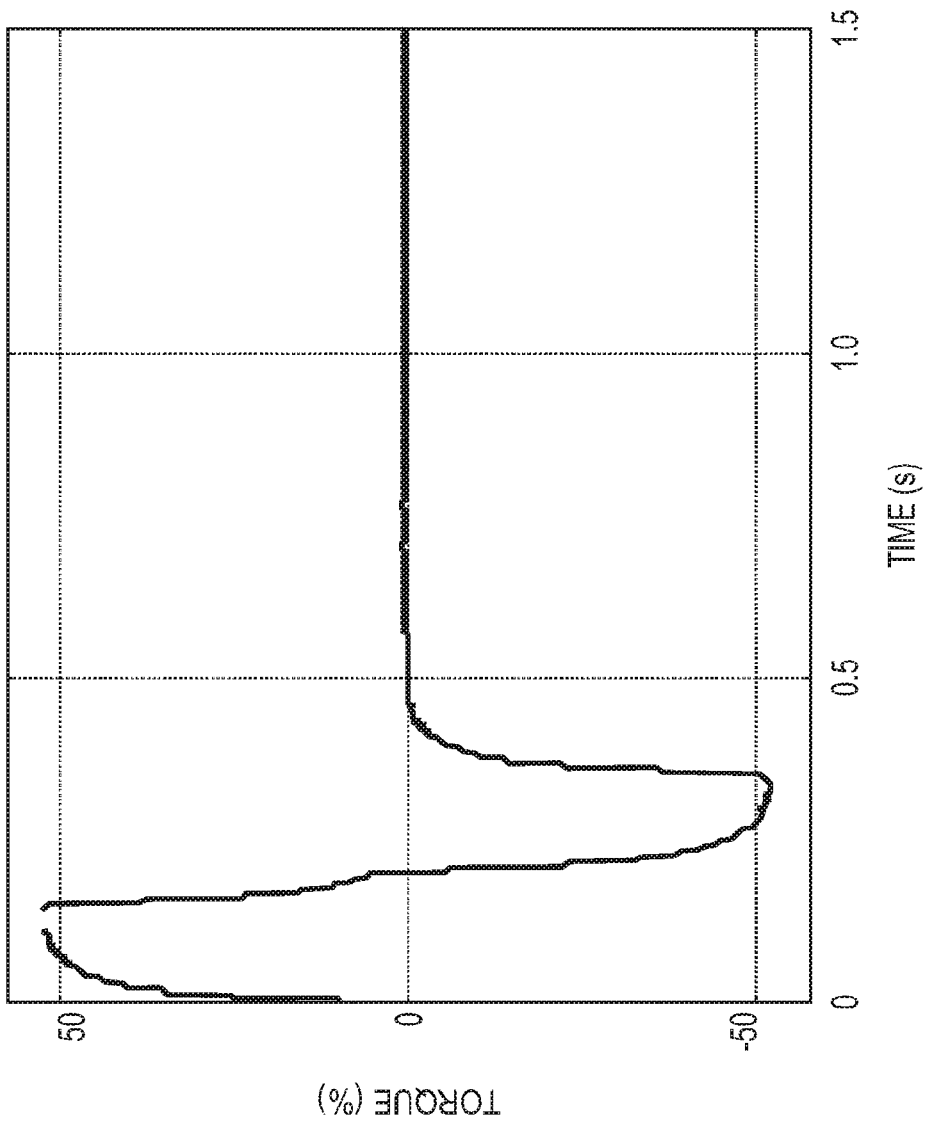
FIG. 33 is a diagram illustrating a simulation result of the time response of the torque command in the case of performing the conventional damping control on the control target 5.
Figure 34:
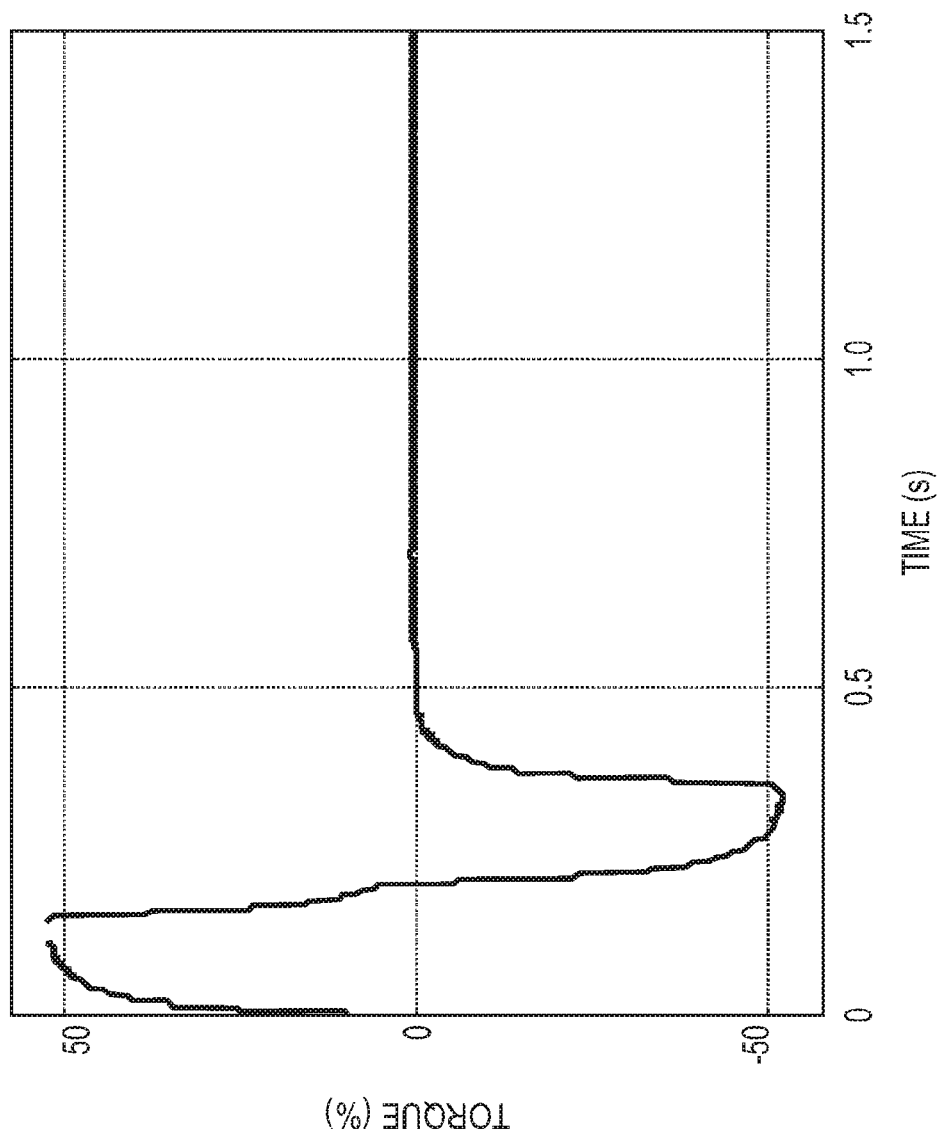
FIG. 34 is a diagram illustrating a simulation result of the time response of the torque command in the case of performing the dual conventional damping control on the control target 5.
Figure 35:
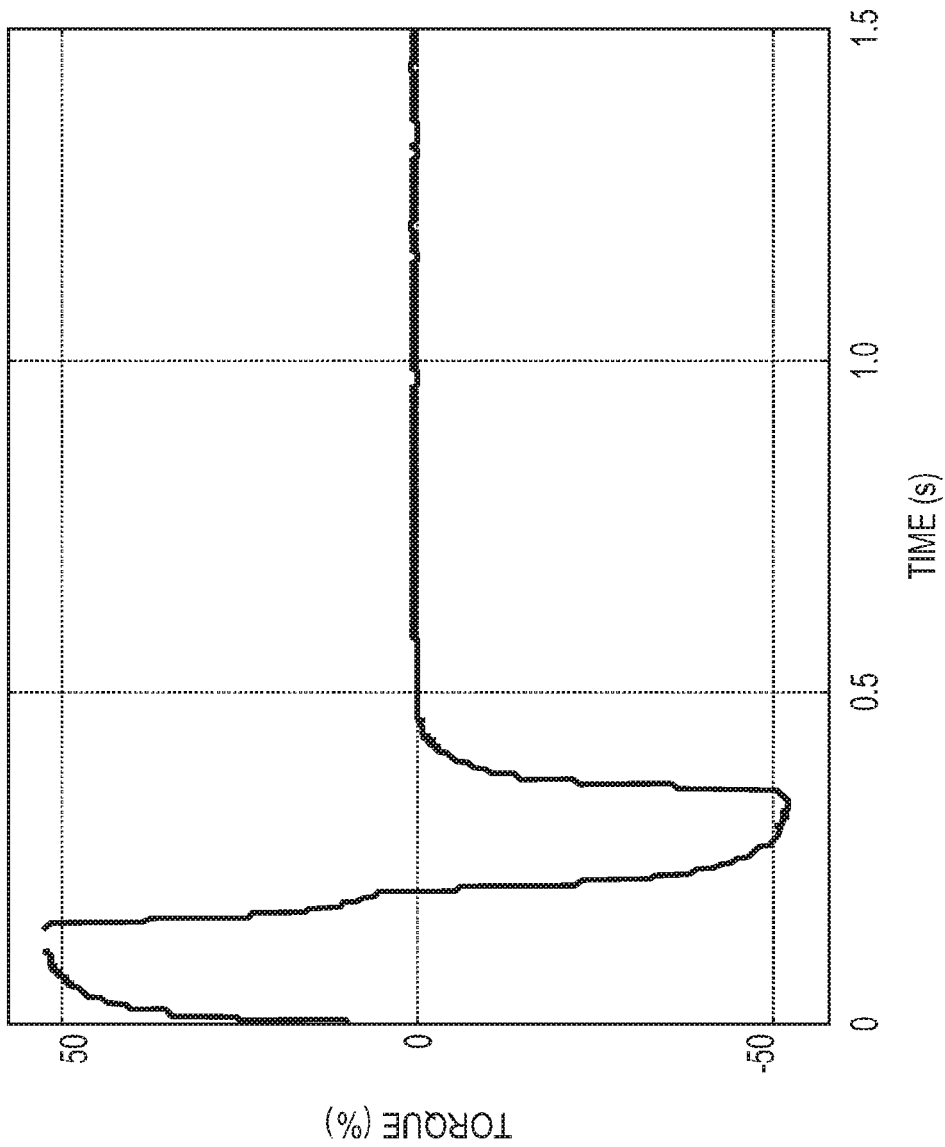
FIG. 35 is a diagram illustrating a simulation result of the time response of the torque command in the case of performing the three-inertia damping control on the control target 5.
Figure 36:
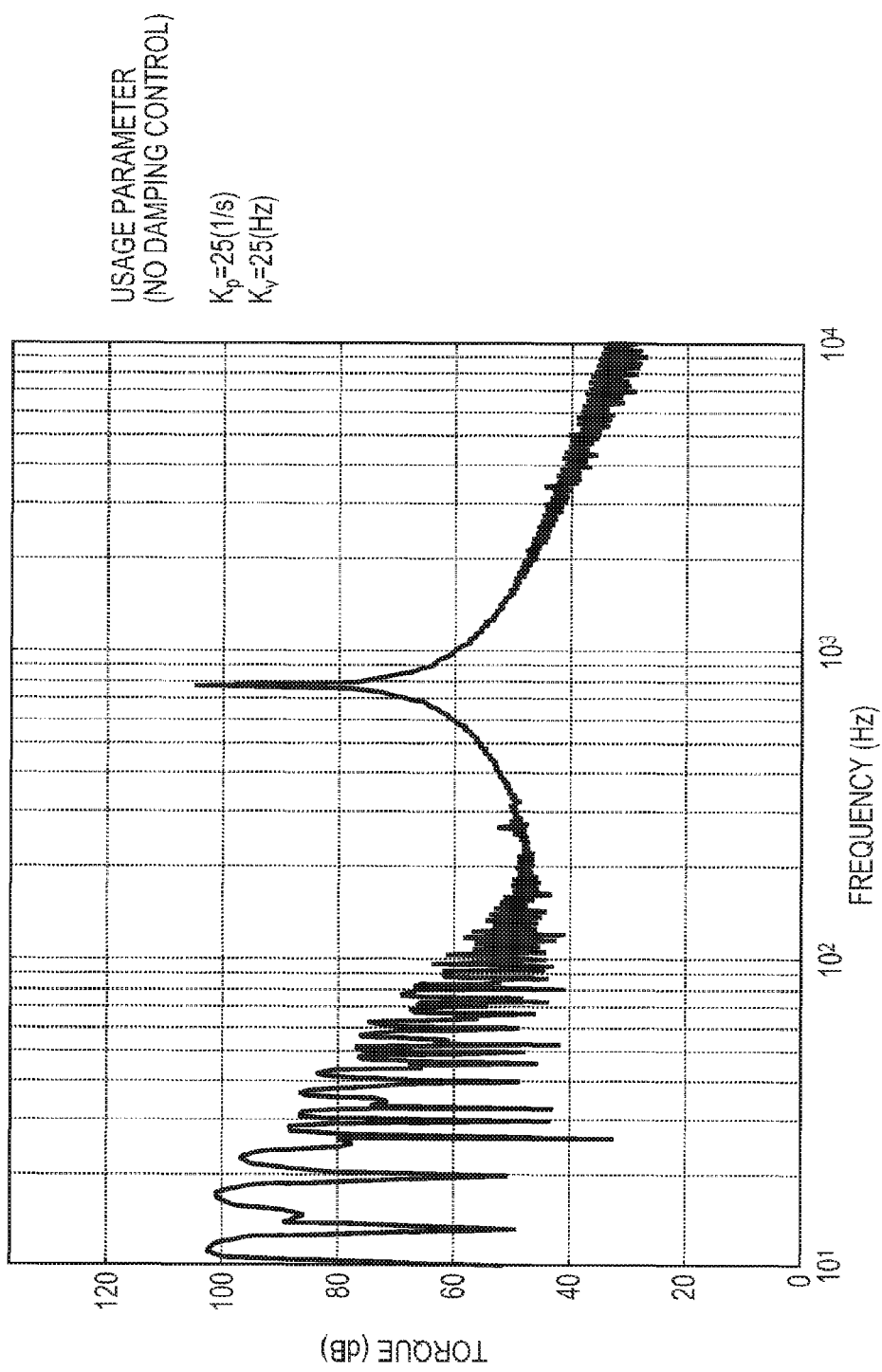
FIG. 36 is a diagram illustrating a simulation result of the frequency characteristics of the output torque in the case of not performing the damping control on the control target 5.
Figure 37:
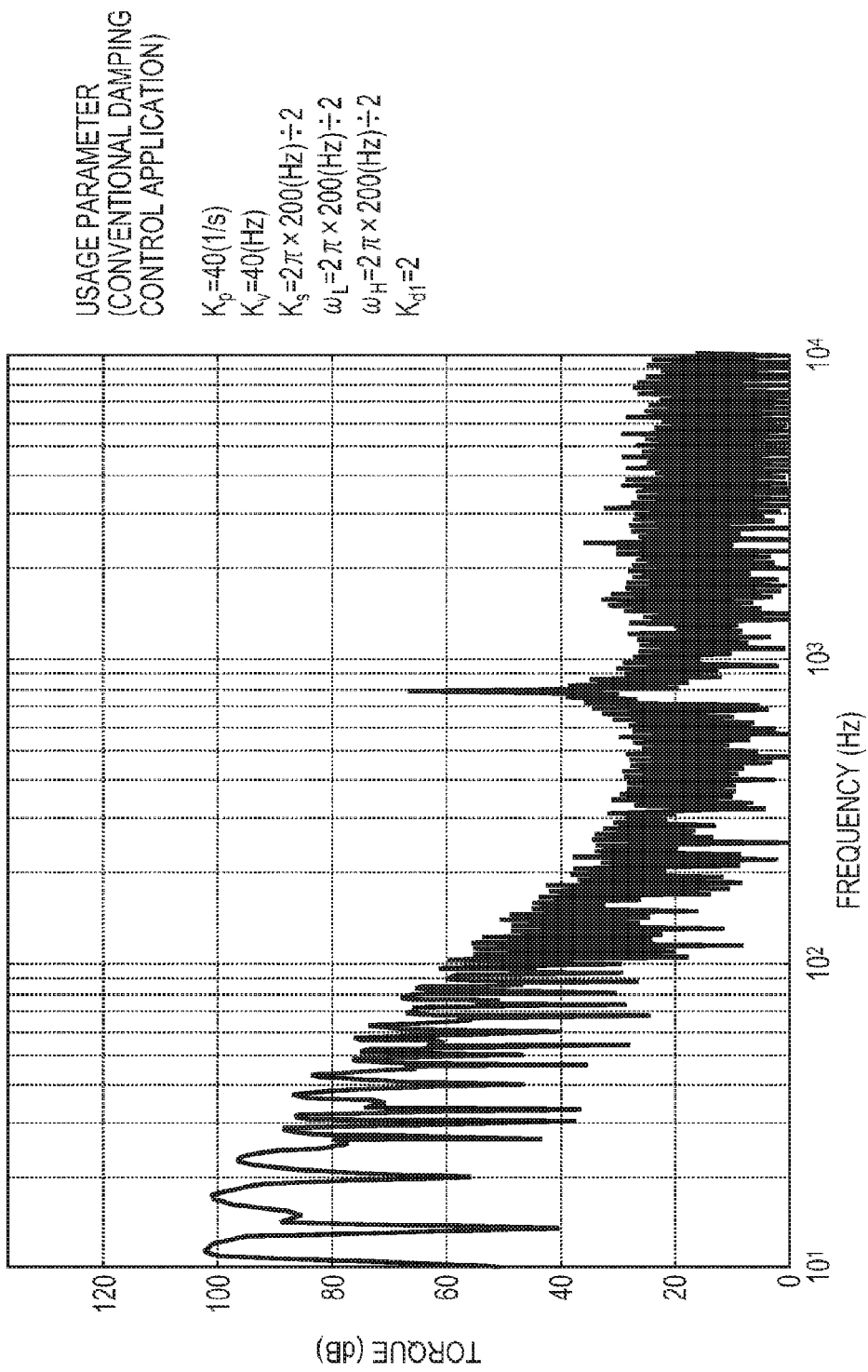
FIG. 37 is a diagram illustrating a simulation result of the frequency characteristics of the output torque in the case of performing the conventional damping control on the control target 5.
Figure 38:
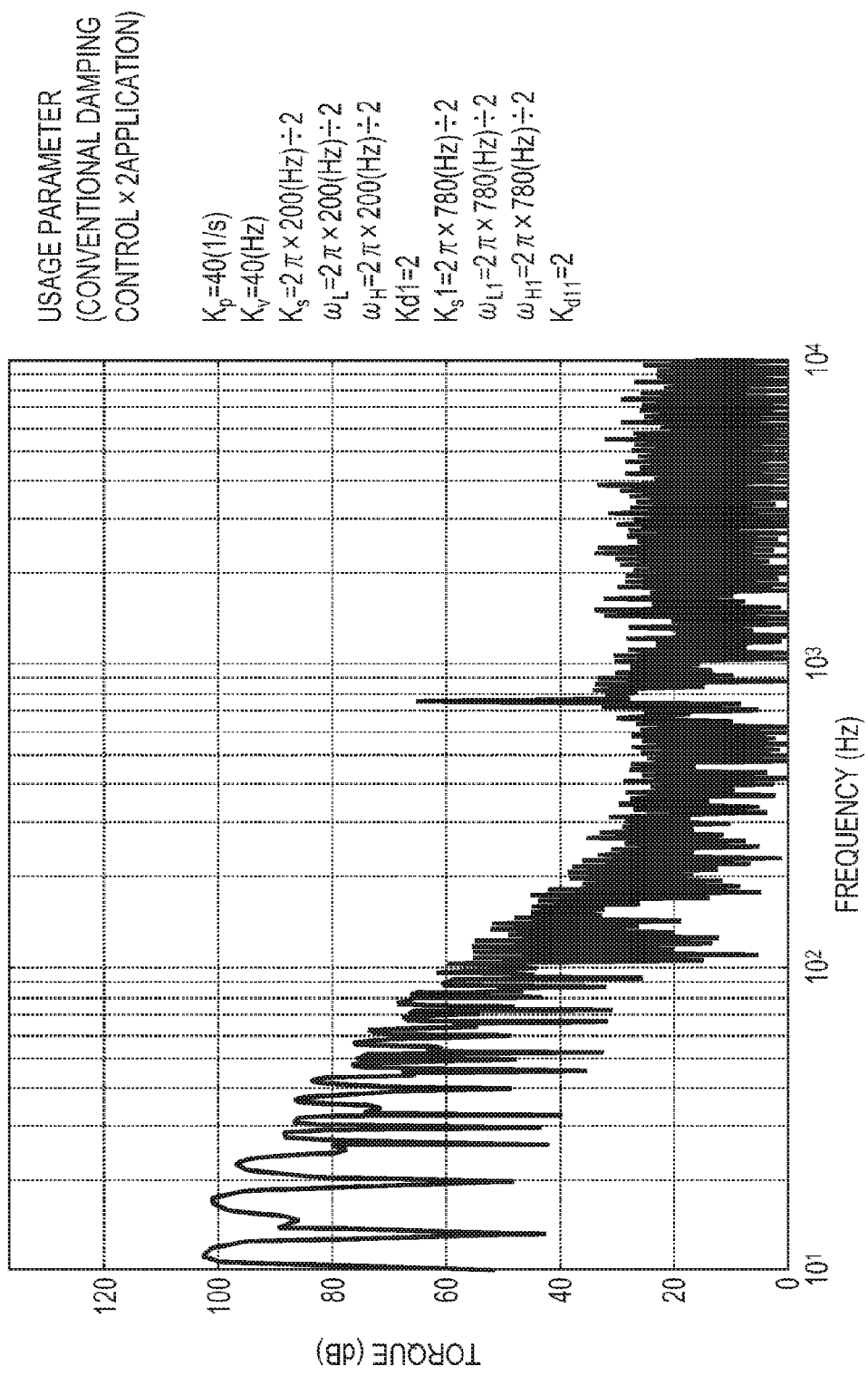
FIG. 38 is a diagram illustrating a simulation result of the frequency characteristics of the output torque in the case of performing the dual conventional damping control on the control target 5.

FIG. 10 illustrates an example of frequency characteristics of a control target 1 (a load machine model 5) having a three-inertia resonance system. FIG. 17 illustrates the frequency characteristics of the control target 2 in which the attenuation coefficients of each of the first resonance point model 51, the second anti-resonance point model 54 and the second resonance point model 53 are changed to 0 with respect to the frequency characteristics of the control target 1 illustrated in FIG. 10. FIG. 22 illustrates the frequency characteristics of a control target 3 in which a second anti-resonance point $\omega_{a2}$ is changed to 230 Hz, a second resonance point $\omega_{r2}$ is changed to 260 Hz, and the attenuation coefficients of each of the first resonance point model 51, the second anti-resonance point model 54 and the second resonance point model 53 are changed to 0 with respect to the frequency characteristics of the control target 1 illustrated in FIG. 10. FIG. 26 illustrates the frequency characteristics of a control target 4 in which the attenuation coefficients of each of the first resonance point model 51 and the second resonance point model 53 are changed to 0.005, and the attenuation coefficient of the second anti-resonance point model 54 is changed to 0 with respect to the frequency characteristics of the control target 1 illustrated in FIG. 10. FIG. 31 illustrates the frequency characteristics of a control target 5 in which the second anti-resonance point $\omega_{a2}$ is changed to 230 Hz, the second resonance point $\omega_{r2}$ is changed to 260 Hz, the attenuation coefficients of each of the first resonance point model 51 and the second resonance point model 53 are changed to 0.001, the attenuation coefficient of the second anti-resonance point model 54 is changed to 0, and the third anti-resonance point model having the anti-resonance point of 729 Hz and the third resonance point model having the resonance point of 778 Hz are added with respect to the frequency characteristics of the control target 1 illustrated in FIG. 10 (the third anti-resonance point model and the third resonant point model are not illustrated).

FIGS. 11 to 16 illustrate the simulation results of the time response of torque command and the frequency characteristics of the output torque in each of the case of not performing the damping control (FIGS. 11 and 14), the case of performing the conventional damping control (FIGS. 12 and 15), and the case of performing the three-inertia damping control of the present embodiment (FIGS. 13 and 16) on the control target 1 of the frequency characteristics of FIG. 10.

FIGS. 18 to 21 illustrate the simulation results of the frequency characteristics of the output torque in each of the case of not performing the damping control (FIG. 18), the case of performing the conventional damping control (FIG. 19), the case of performing the dual conventional damping control (FIG. 20), and the case of performing the three-inertia damping control of the present embodiment (FIG. 21) on the control target 2 of the frequency characteristics of FIG. 17.

Figure 23:
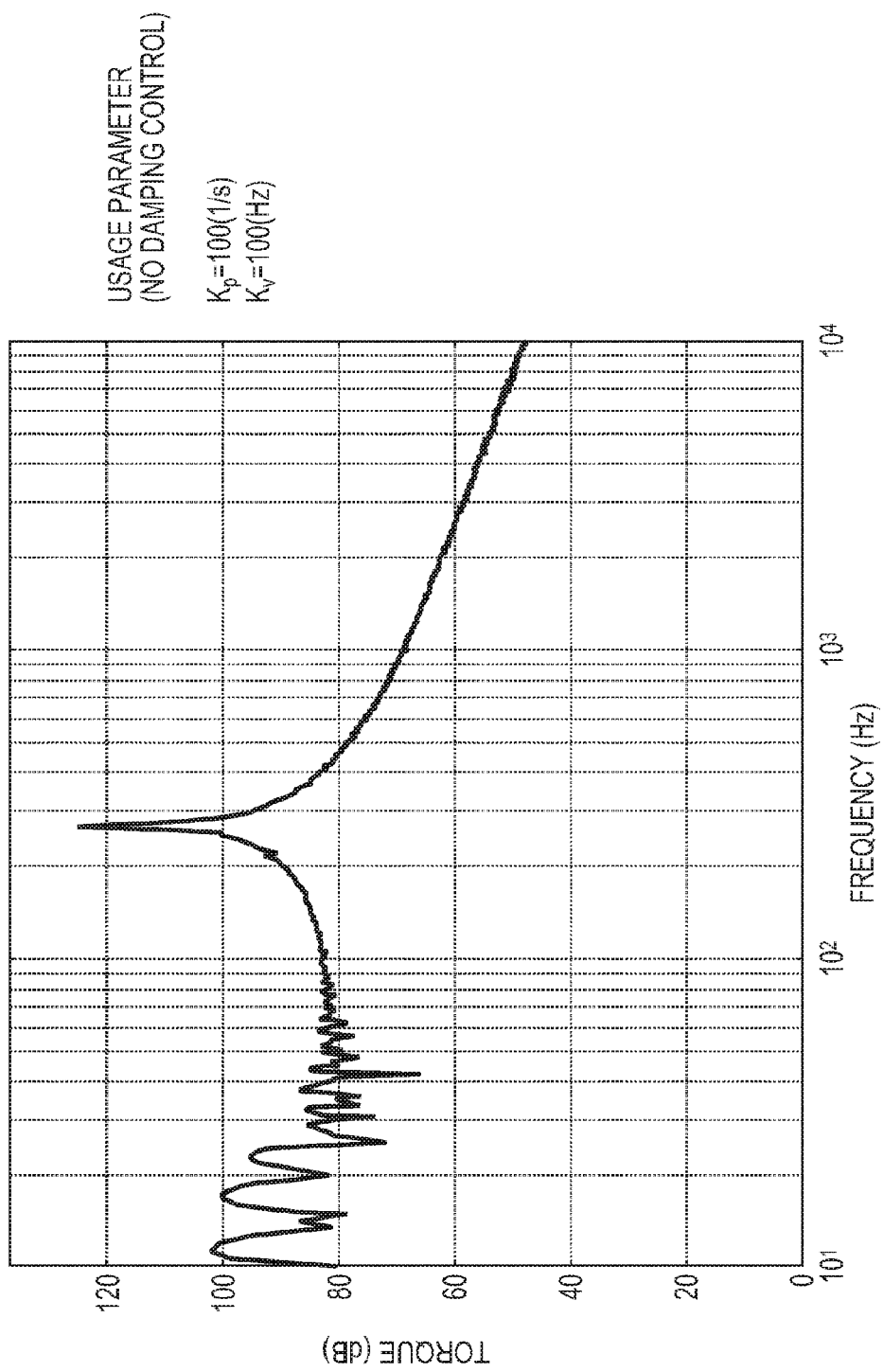
FIG. 23 is a diagram illustrating a simulation result of the frequency characteristics of the output torque in the case of not performing the damping control on the control target 3.
Figure 24:
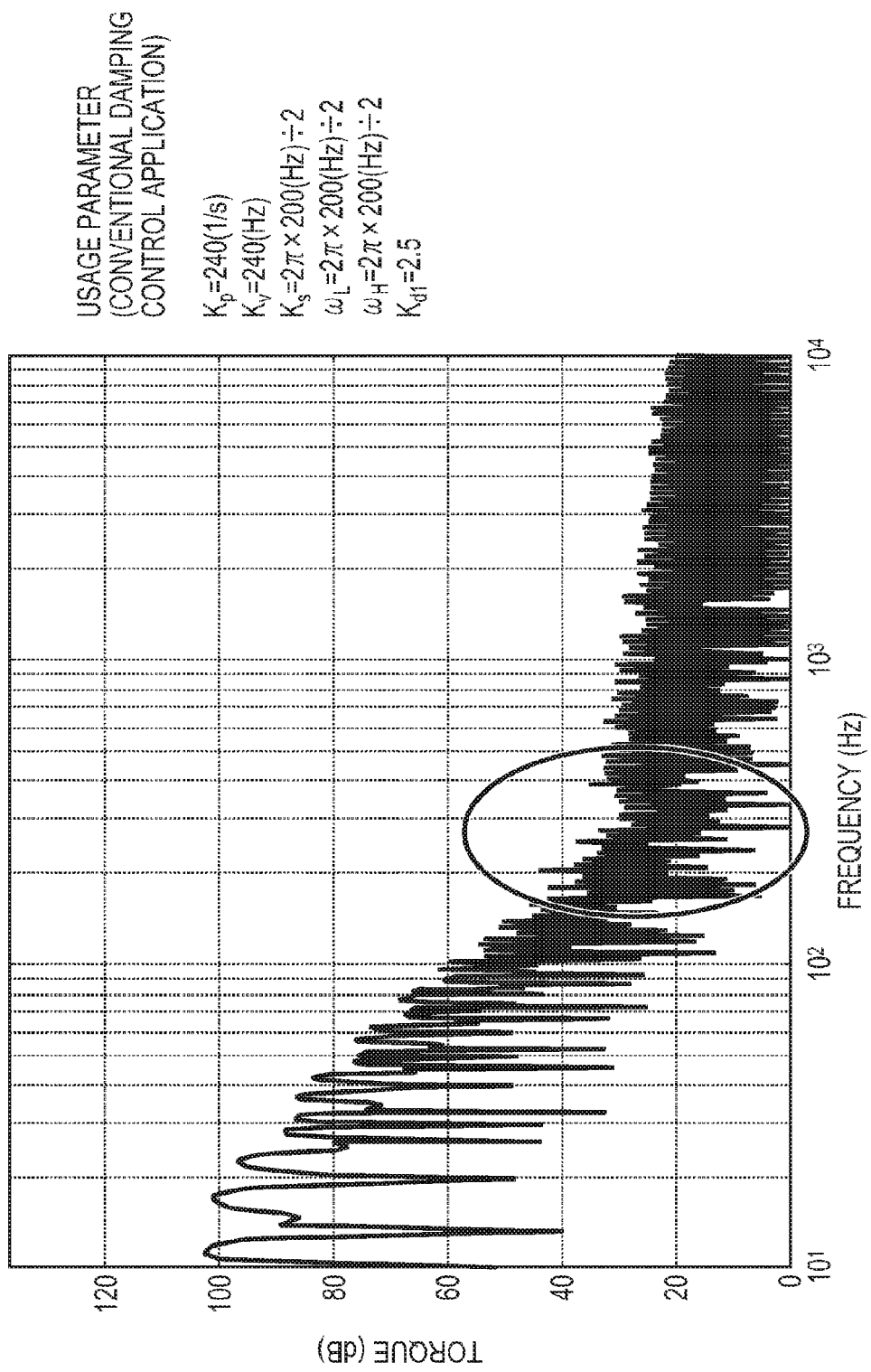
FIG. 24 is a diagram illustrating a simulation result of the frequency characteristics of the output torque in the case of performing the conventional damping control on the control target 3.
Figure 25:
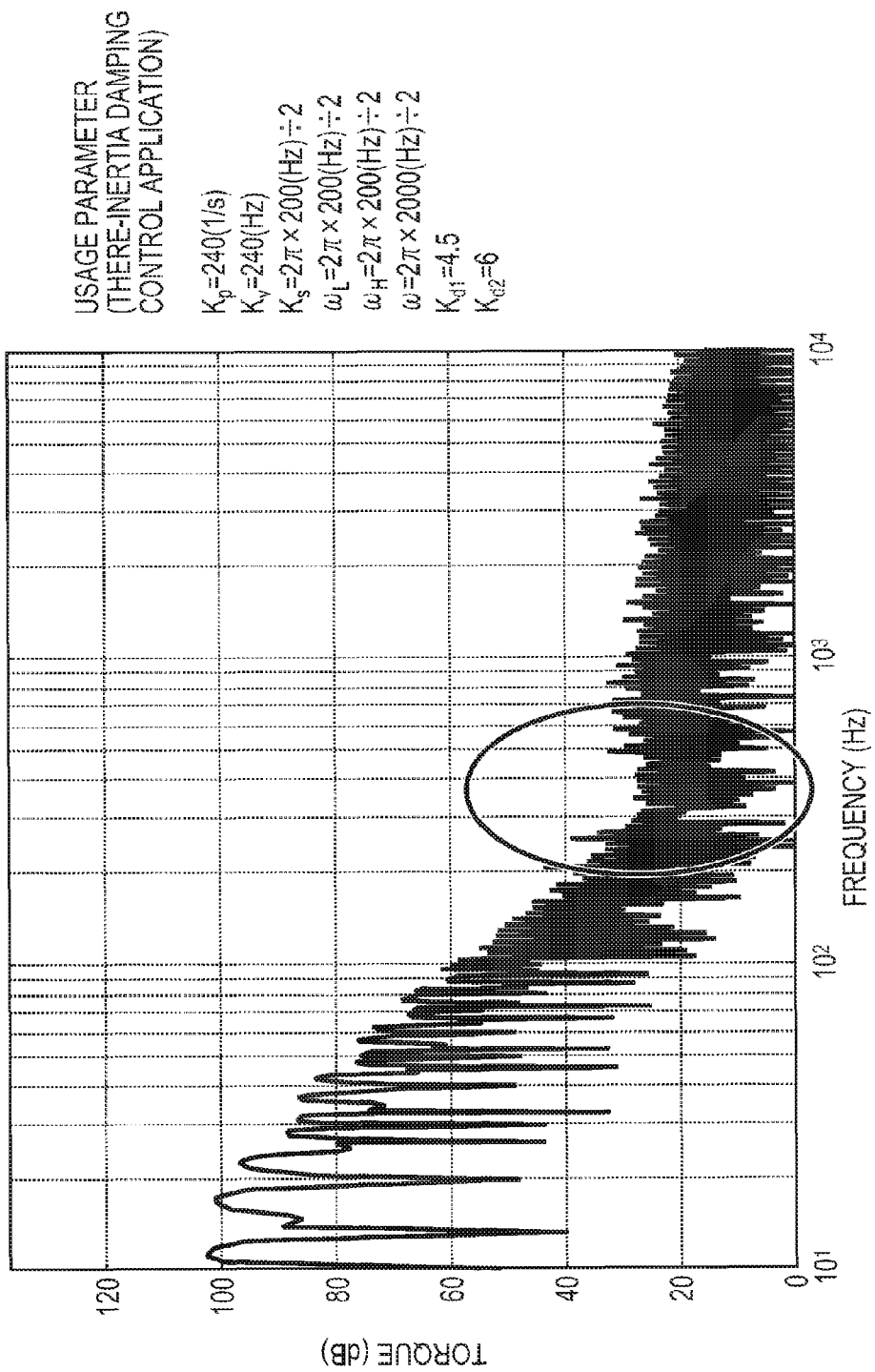
FIG. 25 is a diagram illustrating a simulation result of the frequency characteristics of the output torque in the case of performing a three-inertia damping control on the control target 3.

FIGS. 23 to 25 illustrate the simulation results of the frequency characteristics of the output torque in each of the case of not performing the damping control (FIG. 23), the case of performing the conventional damping control (FIG. 24), and the case of performing the three-inertia damping control of the present embodiment (FIG. 25) on the control target 3 of the frequency characteristics of FIG. 22.

FIGS. 27 to 30 illustrate the simulation results of the frequency characteristics of the output torque in each of the case of not performing the damping control (FIG. 27), the case of performing the conventional damping control (FIG. 28), the case of performing the dual conventional damping control (FIG. 29), and the case of performing the three-inertia damping control of the present embodiment (FIG. 30) on the control target 4 of the frequency characteristics of FIG. 26.

FIGS. 32 to 39 illustrate the simulation results of the time response of the torque command and the frequency characteristics of the output torque in each of the case of not performing the damping control (FIGS. 32 and 36), the case of performing the conventional damping control (FIGS. 33 and 37), the case of performing the dual conventional damping control (FIGS. 34 and 38), and the case of performing the three-inertia damping control of the present embodiment (FIGS. 35 and 39) on the control target 5 of the frequency characteristics of FIG. 31.

Further, the details of the usage parameters in case of performing (the case of not performing) each damping control are illustrated with the frequency characteristics of each of the output torques.

In the control target 1 of FIG. 10, although a certain degree of damping effects are obtained in both of the conventional damping control and the three-inertia damping control of the present embodiment, there is no large difference in the effect between them. However, in the control target 2 illustrated in FIG. 17, a sufficient damping effect is not obtained by the conventional damping control and the dual conventional damping control, but a high damping effect is obtained by the three-inertia damping control, and a difference in effect between them is clearly seen. Further, in the control target 3 of FIG. 22, a slight difference in effect is seen in the frequency characteristics of the motor torque (see the positions in the ellipse of FIGS. 24 and 25). Further, in the control target 4 of FIG. 26, as it is clear from a comparison of the usage parameters illustrated in FIGS. 27 to 30, it is understood that the position loop gain Kp and the speed loop gain Kv can be set to be greater than the conventional damping control and the dual conventional damping control (changing from gain 85 to gain 120), while suppressing the vibration by applying the three-inertia damping control of the present embodiment. Further, in the control target 5 having a four-inertia resonance system illustrated in FIG. 31, none of the conventional damping control and the dual conventional damping control are completely damped (especially, referring to the frequency characteristics of the torque output of FIGS. 37 and 38), but it is clear that the three-inertia damping control of the present embodiment obtains the sufficient damping effect and effectively functions. Although the principle of the present embodiment is theoretically described through the three-inertia system as an example, as it is understood from the simulation results of FIGS. 37 and 38, the method of the present embodiment is also effective for the four-inertia system (the peaks of the resonance are three). That is, as illustrated in FIG. 9, by adjusting Ks, Kd1 and Kd2, it is also possible to obtain the damping effect in a multi-inertia system with three or more resonance peaks. Specifically, Ks, Kd1 and Kd2 are adjusted so that the vibration frequency desired to be damped becomes an effective range (within about ±20°) of the damping control of FIG. 9.

<Effects of Present Embodiment>

According to the above-described embodiment, the following effects are obtained. That is, in the motor control apparatus 100 of the present embodiment, a first differential speed is further input to the conventional damping control in parallel with the first feedback gain $K_{d1}$ to change its frequency characteristics, and by including the stabilizing compensator 9 which adds the frequency characteristics to the output of the first feedback gain $K_{d1}$, it is possible to widen the band of the vibration components capable of being suppressed by the damping control (see FIGS. 8 and 9). Thus, since it is possible to suppress the vibration components of the two resonance systems having close band, that is, it is also possible to suppress the influence of the mechanical resonance for the three-inertia system, it is possible to further enhance the speed loop gain Kv. Further, by the appropriate adjustment as illustrated in FIG. 9, it is also possible to suppress the vibration components of the plurality of resonance systems in the multi-inertia system of three- or more inertia, and it is possible to further enhance the speed loop gain Kv.

Also, particularly, in this embodiment, the stabilizing compensator 9 changes the frequency characteristics to enhance the gains of the frequency components equal to or higher than the cut-off frequency of the speed estimator 6 in the first differential speed and to reduce a phase variation in the frequency band regarding the vibration suppression in the frequency characteristics of the path from the differential speed u of the damping principle to the output signal y of the first adder 10 (to bring the phase close to zero). The main band in which the vibration components can be suppressed by the conventional damping control was only a band near the cut-off frequency of the speed estimator 6. Therefore, when the stabilizing compensator 9 changes the frequency characteristic to enhance the gain (the gain on the Bode diagram, that is, the amplitude ratio) of the frequency components equal to or higher than the cut-off frequency of the speed estimator 6 in the first differential speed and to reduce the phase variation in the frequency band regarding the vibration suppression in the frequency characteristics of the path from the differential speed u of the damping principle to the output signal y of the first adder 10, the damping control can suppress the vibration components even in a wide band of the cut-off frequency or higher of the speed estimator 6.

Also, in this embodiment, in particular, since the stabilizing compensator 9 has a series combination between the differentiator (s of the first-order) and the second feedback gain $K_{d2}$, it is possible to change the frequency characteristics so that the gain of the components of a predetermined frequency or higher is enhanced and the phase variation in the frequency band regarding the vibration suppression in the frequency characteristics of the path from the differential speed u of the damping principle to the output signal y of the first adder 10 is reduced (to bring the phase close to zero).

Further, in the present embodiment, in particular, since the differentiator of the stabilizing compensator 9 has an approximate differentiator 91 ($=s/(s+\omega)$), the adjustment of the second feedback gain $K_{d2}$ is facilitated.

Also, in this embodiment, in particular, the transfer function of the stabilizing compensator 9 is set so that the coefficients of the differentiation (s) of each-order in the transfer function of the closed loop from the speed deviation of the system including the torque command generation unit 2, the speed estimator 6, the first feedback gain $K_{d1}$, the motor model 4, and the three-inertia resonance system machine driven by the motor to the motor speed become 1 or a value within which the second feedback gain $K_{d2}$ (that is, attenuation coefficient; damping gain) falls. Thus, the functional damping control becomes possible as compared to the conventional damping control, thereby enabling a high response by setting the feedback loop gain Kv to a high level.

Also, in this embodiment, in particular, the phase adjusting high-pass filter 81 and the phase adjusting low-pass filter 82 for adjusting the phase of the first differential speed before being input to the first feedback gain $K_{d1}$ are provided. Thus, by adjusting the phase of the vibration components of the target suppressed by the damping control, it is possible to further functionally suppress the influences of mechanical resonance.

Also, in this embodiment, in particular, the cut-off frequency of the speed estimator 6, and the cut-off frequency of the phase adjusting high-pass filter 81 and the phase adjusting low-pass filter 82 can be adjusted to the range from approximately ½ to approximately ⅓ of the frequency of the damping target. When the second feedback gain $K_{d2}$ is excessively adjusted, the phase of the vibration frequency suppressed by the damping control is shifted and the damping effect is reduced. However, by adjusting the cut-off frequency of the speed estimator 6, and the cut-off frequency of the phase adjusting high-pass filter 81 and the phase adjusting low-pass filter 82 to the range from approximately ½ to approximately ⅓ of the frequency of the damping target, it is possible to recover the phase again and maintain the damping effect.

Further, in addition to those previously described, the methods of the above-described embodiments and the modified examples may be suitably combined and used.

Additionally, although it is not specifically described, the present embodiment may be embodied with an addition of various changes within a scope that does not depart from its spirit.

REFERENCE SIGNS LIST 1 first subtracter
2 torque command generation unit
3 torque command filter
4 motor model
5 load machine model
6 speed estimator
7 second subtracter
8 phase compensator
9 stabilizing compensator
10 first adder
11 third subtracter
51 first resonance point model
52 first anti-resonance point model
53 second resonance point model
54 second anti-resonance point model
61 equivalent rigid body characteristic unit
62 speed adder
63 integrator
81 phase adjusting high-pass filter
82 phase adjusting low-pass filter
91 approximate differentiator
100 motor control apparatus
$K_{d1}$ first feedback gain
$K_{d2}$ second feedback gain
Ks adjustment gain

The invention claimed is:

1. A motor control apparatus for controlling a motor, comprising:
a speed estimator configured to estimate and output an equivalent rigid body speed of the motor, based on a torque command that is input to the motor;
a first feedback gain configured to obtain a first differential speed between a motor speed and the equivalent rigid body speed;
a torque command generation unit configured to generate the torque command, based on a speed deviation between a speed command and a second differential speed between the motor speed and the output of the first feedback gain; and
a stabilizing compensator configured to obtain the first differential speed in parallel with the first feedback gain, to change frequency characteristics of the first differential speed and to add the frequency characteristics to an output of the first feedback gain.

2. The motor control apparatus according to claim 1, wherein
the stabilizing compensator is configured to change the frequency characteristics to enhance a gain of the frequency components equal to or higher than a cut-off frequency of the speed estimator in the first differential speed and to reduce a change in phase of the frequency components in the frequency characteristics of the first differential speed.

3. The motor control apparatus according to claim 2, wherein
the stabilizing compensator is configured to change the frequency characteristics to reduce a phase variation in a frequency band regarding a vibration suppression in the frequency characteristics from a generation point of the first differential speed to an addition point between an output of the first feedback gain and an output of the stabilizing compensator.

4. The motor control apparatus according to claim 3, wherein
the stabilizing compensator has a series combination of a differentiator and a second feedback gain.

5. The motor control apparatus according to claim 4, wherein
the differentiator has an approximate differentiator.

6. The motor control apparatus according to claim 5, wherein
a transfer function of the stabilizing compensator is configured to be set so that the coefficients of the differentiation of each-order in a transfer function of a closed loop from the speed deviation of a system including the torque command generation unit, the speed estimator, the first feedback gain, the motor, and a three-inertia resonance system machine driven by the motor to the motor speed become 1 or a value within which the second feedback gain falls.

7. A motor control apparatus for controlling a motor, comprising:
a speed estimator configured to estimate and output an equivalent rigid body speed of the motor, based on a torque command that is input to the motor;
a first feedback gain configured to obtain a first differential speed between a motor speed and the equivalent rigid body speed;
a torque command generation unit configured to generate the torque command, based on a speed deviation between a speed command and a second differential speed between the motor speed and the output of the first feedback gain; and
a stabilizing compensator formed by a series combination of an approximate differentiator and a second feedback gain, the approximate differentiator being configured to input the first differential speed in parallel with the first feedback gain and to add an output of the approximate differentiator to an output of the first feedback gain, the stabilizing compensator changing the frequency characteristics to enhance a gain of the frequency components equal to or higher than a cut-off frequency of the speed estimator in the first differential speed and to reduce a phase variation in a frequency band regarding a vibration suppression in the frequency characteristics from a generation point of the first differential speed to an addition point between the output of the first feedback gain and the output of the stabilizing compensator.

8. The motor control apparatus according to claim 7, further comprising:
a phase adjusting high-pass filter and a phase adjusting low-pass filter configured to adjust a phase of the first differential speed before being input to the first feedback gain.

9. The motor control apparatus according to claim 8, wherein
the cut-off frequency of the speed estimator, and the cut-off frequencies of the phase adjusting high-pass filter and the phase adjusting low-pass filter can be adjusted to the range from approximately ½ to approximately ⅓ of the frequency of a damping target.

10. A motor control apparatus for controlling a motor, comprising:
a speed estimator configured to estimate and output an equivalent rigid body speed of the motor, based on a torque command that is input to the motor;
a first feedback gain configured to input a first differential speed between a motor speed and the equivalent rigid body speed;
a torque command generation unit configured to generate the torque command, based on a speed deviation between the speed command and a second differential speed between the motor speed and the output of the first feedback gain; and
means for inputting the first differential speed in parallel with the first feedback gain to change frequency characteristics of the first differential speed and adding the frequency characteristics to the output of the first feedback gain.

11. A motor control method executed by a calculating device provided in a motor control apparatus for controlling a motor, the method comprising:
estimating and outputting an equivalent rigid body speed of the motor based on a torque command that is input to the motor;
obtaining a first differential speed between a motor speed and the equivalent rigid body speed to multiply a first feedback gain;
generating the torque command, based on a speed deviation between the speed command and a second differential speed between the motor speed and a multiplication output of the first feedback gain; and
obtaining the first differential speed separately from the multiplication of the first feedback gain to change frequency characteristics of the first differential speed and adding the frequency characteristics to the multiplication output of the first feedback gain.

* * * * *